United States Patent [19]
Reid

[11] Patent Number: 4,532,038
[45] Date of Patent: Jul. 30, 1985

[54] FLOW CONTROL APPARATUS FOR AEROBIC SEWAGE TREATMENT

[76] Inventor: John H. Reid, 7 Stansbury Ct., Fredericksburg, Va. 22401

[21] Appl. No.: 492,156

[22] Filed: May 11, 1983

Related U.S. Application Data

[60] Division of Ser. No. 28,386, Apr. 4, 1979, abandoned, which is a continuation of Ser. No. 649,995, Jan. 19, 1976, abandoned.

[51] Int. Cl.³ .................................................. C02F 3/20
[52] U.S. Cl. .................................... 210/194; 210/219; 210/220; 210/926; 261/91; 261/93; 261/123; 261/36 R
[58] Field of Search .................... 210/219, 220, 221.1, 210/221.2, 258, 262, 194, 926, 629, 628, 621; 261/121 R, 77, 124, 34 R, 36 R, 91, 93, 123; 417/108-117

[56] References Cited

U.S. PATENT DOCUMENTS

| | | | |
|---|---|---|---|
| 1,643,273 | 9/1927 | Imhoff | 210/926 |
| 1,900,809 | 3/1933 | Hammerly | 210/194 |
| 2,263,534 | 11/1941 | Aldridge | 261/93 |
| 3,510,110 | 5/1970 | Klein | 210/926 |
| 3,840,216 | 10/1974 | Smith et al. | 261/120 |
| 3,990,974 | 11/1976 | Sullins | 210/522 |
| 4,110,980 | 9/1978 | Foulke | 417/108 |

FOREIGN PATENT DOCUMENTS

| | | | |
|---|---|---|---|
| 166160 | 8/1974 | Hungary | 210/926 |
| 729 | of 1915 | United Kingdom | 210/926 |
| 796438 | 6/1958 | United Kingdom | 210/926 |
| 796436 | 6/1958 | United Kingdom | 210/926 |

OTHER PUBLICATIONS

Soo, S. L., "Power Spray Cooling", published in American Society of Mechanical Engrs., Publication Bulletin, 75-WA/PWR-3, Paper Presented 11-30-75.

Primary Examiner—Benoît Castel
Attorney, Agent, or Firm—Marion P. Lelong; William H. Murray

[57] ABSTRACT

In aerobic wastewater treatment systems, such as sewage treatment, liquid in a channel spanned by a liquid-tight barrier is moved past the barrier by a liquid-gas contact pump, thus dissolving a gas in the liquid and creating a differential head that provides flow energy for moving the liquid in plug-type flow through the channel, which is preferably a continuous-flow pipeline or a circuit-flow oxidation ditch, without energy-wasteful vertical circulation. The barrier further provides a structure for mounting submerged static aerators or a draft tube, in combination with a surface aerator, such as a submerged turbine or surface-disposed impeller aerator, as the liquid-gas contact pump. The barrier is disposed at sufficient depth, when combined with static aerators or when telescopically attached to the draft tube of a floating surface aerator, to enable the liquid level to be selectively varied so that flow equalization to an oxidation ditch and wastewater storage therewithin are provided. Because of the plug-type flow and capability of maintaining it at 0.75-1.25 feet per second, a grit settling capability can be combined with aerobic digestive treatment within the oxidation ditch by placing a grit settling system slightly past the raw sewage inlet in a channel of the oxidation ditch. By employing a plurality of oxidation ditches, of which one is sequential used for clarification, and by incorporating a grit settling system within each of the oxidation ditches, the entire wastewater output from a large municipality, slaughterhouse, or poultry processing plant, for example, can be processed without preliminary or supplementary treatment in any other apparatus.

11 Claims, 45 Drawing Figures

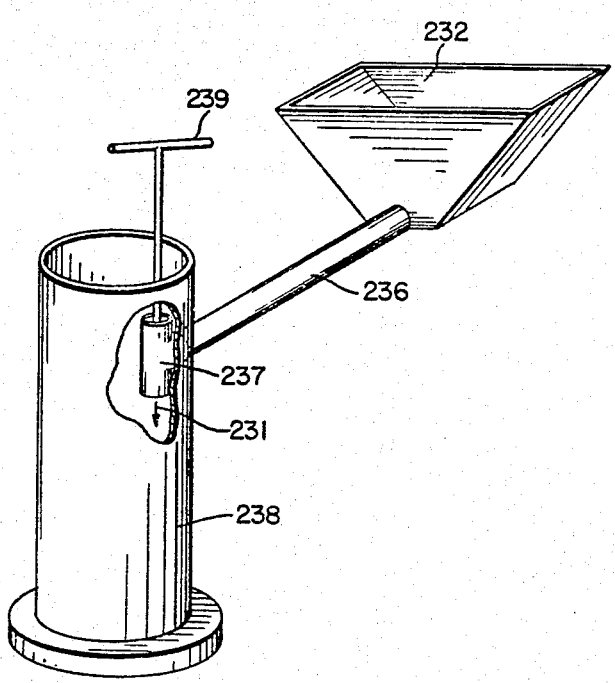
FIG. 20
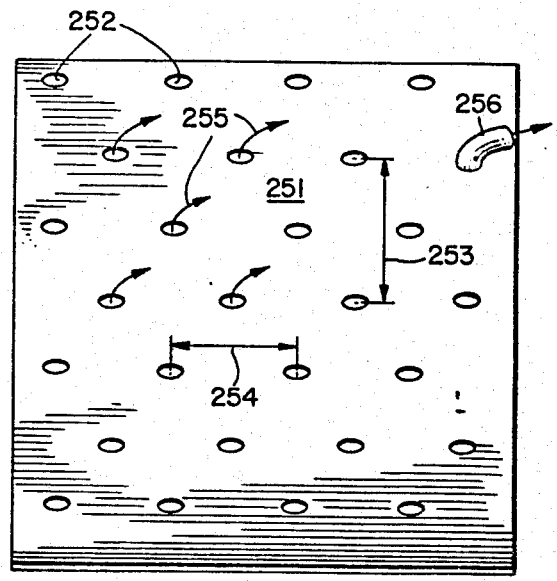
FIG. 21
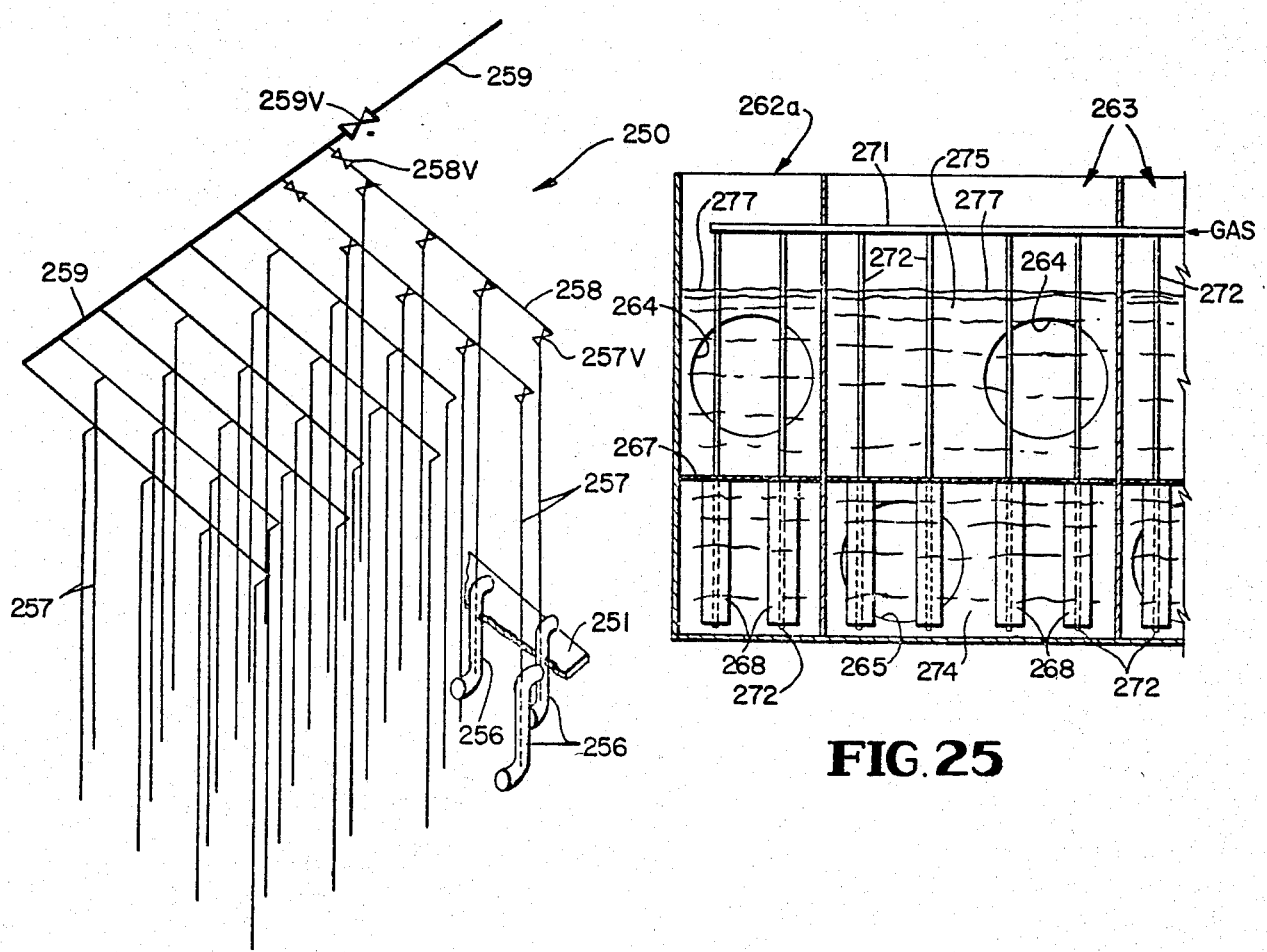
FIG. 22
FIG. 25

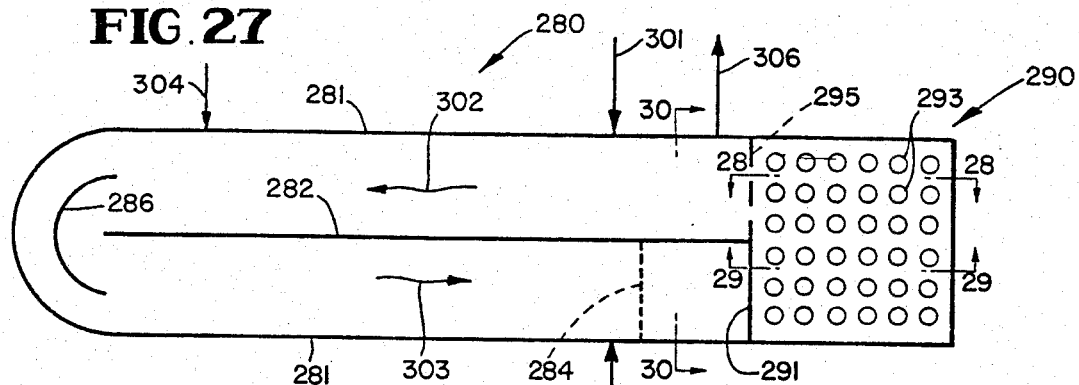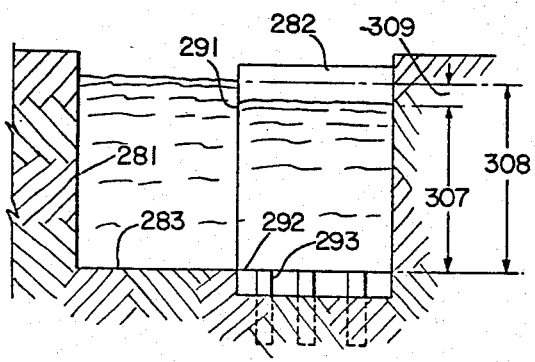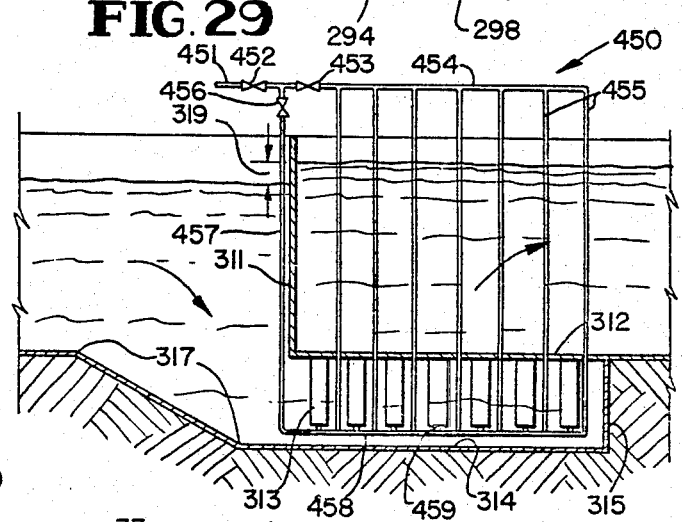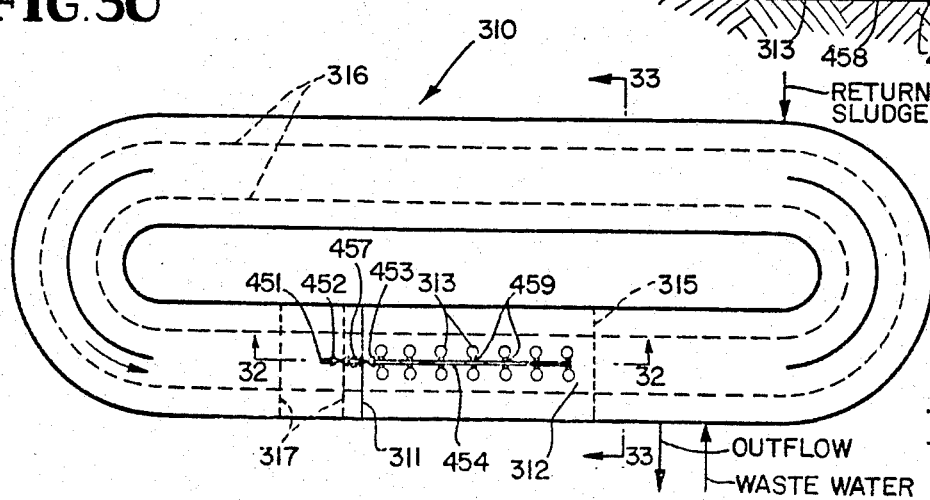

FLOW CONTROL APPARATUS FOR AEROBIC SEWAGE TREATMENT

CROSS REFERENCES TO RELATED APPLICATIONS

This application is a division of Ser. No. 028,386, filed Apr. 4, 1979, which is a continuation of Ser. No. 649,995, filed Jan. 19, 1976, both now abandoned.

BACKGROUND OF THE INVENTION

1. Field of the Invention

This invention relates to gas-liquid contacting devices and the use of such devices in liquid treatment systems. The invention additionally relates to oxygen-absorption processes requiring repeated and prolonged air-liquid contact in sequential stages. The invention especially relates to methods and apparatus for aeration pumping of sewage in aerobic purification systems such as oxidation ditches and aeration ponds. The invention further relates to processes for treating slurries, particularly water treatment processes employing granular carbon.

2. Review of the Prior Art

Many processes have been developed for absorbing a gas in a liquid in order to effect a chemical reaction that precipitates a solute, decomposes a dissolved compound, bleaches suspended fibers, or forms a desired solution, for example. Some liquid treatment processes require that a gas be absorbed in the liquid in order to support living organisms such as fish or bacteria. Among the liquid treatment processes that support bacteria with dissolved oxygen, commonly termed aerobic processes, a large proportion treat aqueous wastes such as municipal sewage, cannery wastes, dairy wastes, meat-processing wastes, and the like.

Such aerobic processes are commonly accelerated by concentrating and activating the bio-organisms, termed bio-mass or activated sludge, and returning this sludge to be mixed with incoming wastewater which supplies food for the organisms. Activated-sludge processes for aerobic treatment of wastewaters have followed two main lines of development: vertical-flow aeration basins and circuit-flow oxidation ditches.

In an early oxidation-ditch process, Dutch Pat. No. 87,500 discloses horizontally mounted rotors having brush surfaces for adding oxygen to sewage and causing the sewage to flow for a period of time in a closed-loop circuit within an ovally laid-out ditch, the liquid then being clarified by settling and excess sludge being removed. In subsequent developments directed to adding oxygen to sewage and inducing circuit-flow circulation in oxidation ditches, U.S. Pat. No. 3,336,016 discloses an S-shaped duct, U.S. Pat. No. 3,510,110 the combination of a longitudinal partition and a vertically disposed surface aerator which is adjacent thereto, and U.S. Pat. No. 3,846,292 a plurality of subsurface ejector aerators.

Finally, U.S. Pat. No. 3,900,394 discloses a sewage purification process, to be carried out in a circuit-flow oxidation ditch having an impeller-type aerator at one or both ends, which comprises sequential aeration of incoming sewage, aerobic decomposition and depletion of its oxygen content, introduction of additional sewage to the oxygen-starved bacteria, and, simultaneously, aerobic decomposition and denitrification of the additional sewage as the bacteria break down its nitrates.

Returning to the concept of vertical-flow aeration basins, U.S. Pat. No. 1,247,540 teaches a spaced array of subsurface air diffusers in a tank. U.S. Pat. No. 3,452,966 discloses an open-ended vertical tube, with a helical baffle therein for creating turbulence and mixing air and liquid, which is submerged in sewage liquid with its lower end above a gas bubble generator. U.S. Pat. No. 3,479,017 also describes one of several impeller aerators which are vertically disposed for beating the surface of a basin while causing vertical circulation of its contents. U.S. Pat. No. 3,664,638 discloses a static mixer which is presently used as the preferred subsurface aeration device in sewage aeration basins, particularly when mounted as in FIG. 2 of the drawings and spaced in close array on the of the basin bottom.

Vertical-flow aeration basins are typically aerated on a large scale with one or more impeller-type aerators which are vertically mounted and disposed at the surface of the liquid, as discussed in *Water & Wastes Engineering*, Sept. 1975, pages 76–79, using an aerator such as is described in U.S. Pat. No. 3,479,017 and producing a uniform dissolved-oxygen (D.O.) content of 2.0 mg/liter. Such impeller aerators are frequently mounted within and at the upper open end of a draft tube extending partially or entirely to the bottom of the basin so that the aerator can more efficiently pump liquid from the bottom of the basin, having a depth up to 40 feet, and disperse it over the surface of the basin, thereby improving vertical circulation over a wide area. When fitted with a gear reducer to spin a nine-foot diameter impeller at low speeds, oxygen transfer efficiencies of 3.5 pounds $O_2$/hp/hour have been approached.

Returning to the circuit-flow oxidation ditch concept as presently put in practice, only horizontally mounted surface aerators, vertically mounted surface aerators without draft tube devices, and subsurface ejector aerators are used in oxidation ditches having closed-loop or circuit-flow circulation. No static mixers are employed in such oxidation ditches even though subsurface static aeration devices have oxygen transfer efficiencies, rated on a basis of pounds of oxygen transferred to or dissolved in liquid per brake horsepower per hour or per kilowatt-hour, that are equal to or better than the vertically mounted surface aerators and other aeration devices that are presently used in the sewage treatment field. A major advantage of aeration systems using the subsurface static aerator or mixer is that no moving mechanical parts or electrical motors are in contact with or near the liquid being treated because aeration is accomplished by concurrent passage of diffused air and liquid through and mixing within an open-ended vertical tube or conduit having a static internal mixing apparatus. Accordingly, a means for utilizing static mixers in oxidation ditches, while producing circuit-flow circulation therein, is greatly needed.

It is also unfortunate that both horizontally and vertically mounted surface aerators must be used at a relatively fixed level, although the impeller blades of a vertically mounted surface aerator can be slightly varied as to submergence in accordance with dissolved-oxygen content of the liquid being aerated. In contrast, static-mixer aerators can be used in aeration basins in which the surface is varied by two feet or more and also have no limitation as to depth of installation. Accordingly, a depth-variation means is needed for operating impeller aerators within operation ditches in which the depth is varied by several feet in order that these ditches can be available for additional use as storage facilities and for flow equalization of incoming wastewaters.

A basic consideration for this invention derives from the flow pattern, in both oxidation ditches and aeration basins, being principally vertical, with some accompanying horizontal flow in the former. Contact of liquid with air or oxygen is random. No method is available for controlling liquid circulation or frequency of liquid-gas contact. Although frequency of liquid-gas contact appears to be inconsequential because mixing of liquid having various contents of dissolved oxygen soon produces a uniform average content, it is quite important from an efficiency viewpoint. This is so because the necessary driving force increases non-linearly as the dissolved-oxygen content increases.

In consequence, if a portion of the liquid, initially having zero dissolved oxygen, contacts a gas such as air several times, it at first absorbs oxygen very readily but increasingly slowly thereafter. Vertical circulation causes some aerated water to be directly back-mixed into the intake of the aerator. Thus, energy is wasted by attempting to re-aerate water that has already been aerated. A need consequently exists for a flow control method and means for minimizing vertical circulation and turbulent mixing and for bringing liquid and gas into singly occurring contact.

Furthermore, accelerating a mass of liquid to a flow velocity of one foot per second (fps) and decelerating such flow to zero velocity, if in situ clarification in an oxidation ditch is desired, requires both energy and time. A need thus exists for a flow control means for rapidly accelerating and decelerating a mass of liquid, without the random mixing and vertical circulation that presently occurs, in order to combine clarification and aerobic digestion in a sequential procedure within the same oxidation ditch.

Static mixers are hereinafter termed static aerators, whether or not the gas being mixed is air. Impeller-type and submerged-turbine aerators are hereinafter termed surface aerators unless otherwise specifically defined. An aerator is in general a liquid-gas contact pump which is hereinafter to be understood to include a static aerator, a surface aerator, and a fountain discharging a liquid as a jet, spray, and the like into a gaseous atmosphere, such as air.

In prior art treatment of wastewaters, relatively dense foreign objects, which are commonly termed grit, are removed from raw sewage is separate treatment facilities before being sent to an oxidation ditch. A need thus exists, as a matter of simplicity and economy, for a grit-removal method and apparatus by means of which grit can be removed within an oxidation ditch without disturbing its normal aerobic digestive functions so that raw sewage influent can be sent directly from a collection facility to an oxidation ditch without an intermediate grit-removal step.

However, in prior art oxidation ditches, such as those sketched in FIGS. 1 and 4 of the drawings, translational movement of the liquid is created and roughly controlled merely by the momentum effect resulting from the motion of vertically disposed surface aerators, horizontally disposed surface aerators (brush type), or submerged ejector aerators. Turbulence, vertical currents, and non-uniform translational flows interfere with settling of grit in such an oxidation ditch. There is accordingly a concurrent need for a method and means for producing a highly uniform, accurately controlled, and plug-type flow of liquid within an oxidation ditch whereby grit settling and removal therewithin will be feasible.

Static aerators, as they are presently used in vertical-flow aeration basins, receive air from a dispersed grid of air-delivery lines, as indicated in FIG. 2 of the drawings, which are disposed along the bottom of a basin. If inspection, repair, or replacement of a portion of this grid must be performed, the entire basin may have to be partially or even entirely drained, and the static aerators may have to be disturbed. A need accordingly exists for an air delivery means which can be installed in an oxidation ditch and which can be separately removed, inspected, and repaired or replaced without disturbing the static aerators and without requiring drainage of the oxidation ditch.

Static aerators, as presently used for aerating wastewaters, are verticaly disposed and produce not only energy-wasteful mixing of non-aerated water with aeratored water but also vertical circulation of water without appreciable translational movement thereof. A need thus exists for an energy-conserving method and means for horizontally directing the flow of aerated water as it leaves the static aerator.

SUMMARY OF THE INVENTION

An object of this invention is to provide a liquid propulsion apparatus that comprises a barrier means in combination with a gas-contact pump means for producing translational movement of a liquid while absorbing a gas in the liquid.

An object is also to prevent vertical circulation of liquid from the discharge of a pumping device to its intake.

A further object is to provide a mounting means for enabling either a static aerator or an impeller aerator with draft tube to be used for aerating and circulating the liquid in an oxidation ditch without wasteful vertical circulation, random mixing, and repeated aeration of the same liquid.

A still further object is to provide a depth-variation means for enabling an impeller aerator or submerged turbine to be used in either an aeration basin or an oxidation ditch in which depth is selectively variable for storage purposes.

An additional object is to provide a flow-control means for accelerating and decelerating the translational flow of liquid in a channel for a liquid such as an oxidation ditch.

Another object is to provide a mounting means that enables an impeller aerator to be installed anywhere in an oxidation ditch and at any distance from a partition.

Another additional object is to provide a directional-flow intake for conserving and concentrating flow energy in liquid flowing toward the gas-contact pump means.

A further additional object is to provide a directional-flow discharge means for utilizing flow energy in the gas-liquid mixture discharged from the gas-liquid contact pump means to produce useful translational energy.

A still further additional object is to provide an overhead gas delivery apparatus for bringing compressed gas to each static aerator in an array thereof.

Still another object is to provide a means for converting an aeration basin to an oxidation ditch by installing static aerators as the aerating means.

A specific object is to provide an oxidation ditch comprising a grit removal means.

Accordingly, in satisfaction of these objects and in accordance with the spirit and scope of this invention, a barrier means in sealed combination with an aeration means is herein provided that: (1) controls the flow of liquid to the aeration means by allowing flow to occur only through such aeration means, (2) prevents vertical circulation from the exit to the entrance of the aeration means, (3) creates a differential head between an intake body of liquid and a discharge body of liquid on opposite sides of the barrier means having the aeration means as the sole flow-through connecting means, (4) uses the differential head as the energy source for translationally moving the discharge body of liquid, (5) uses the differential head as the energy source for continuously moving the liquid from the discharge body to the intake body in a circuit-flow oxidation ditch, (6) provides a mounting means for a plurality of static aerators, and (7) provides a mounting means anywhere within an oxidation ditch for an impeller aerator in combination with a draft tube, thus enabling an aeration basin having an existing aerator to be converted to an oxidation ditch without requiring a longitudinal partition to be adjacent to the aerator.

This barrier means is a liquid-tight barrier that is sealably attached to a liquid-gas contacting and pumping device between its intake and discharge ends, thereby dividing the liquid in which the pumping device operates into an intake body and a discharge body so that all of the liquid in the intake body must pass through the pumping device to reach the discharge body and none of the liquid in the intake body can pass therethrough more than once.

Operation of the liquid-gas contact pump through the liquid-tight barrier creates a positive differential head because energy has been imparted and transformed into a hydraulic head on the discharge side that is greater than the head on the intake side of the barrier. This differential head is used to provide flow energy for horizontally moving the discharge body of liquid, as in continuous-flow movement to a destination or in circuit-flow circulation within an oxidation ditch. Specifically, the differential-head device of this invention is useful as a flow-control device in both continuous-flow and circuit-flow circulation systems.

The barrier also facilitates controlled acceleration and deceleration of liquid in deep channels such as oxidation ditches. It additionally enables both the quantity flowing through an oxidation ditch and the dissolved-oxygen content therein to be accurately and independently controlled.

The barrier further provides a structure for mounting eithe submerged static mixers or draft tubes for surface-disposed impeller aerators or submerged turbines. The portion of the barrier to which the pumping device is attached may be horizontally, vertically, or obliquely disposed. In addition, a telescopic float mounting means for a surface aerator is provided that enables an oxidation ditch to be utilized for liquid storage and flow equalization of incoming wastewaters.

Translational movement of aerated liquid, as it is propelled by the hydraulic force created by gas-lift pumping through a liquid-tight barrier, is controlled so accurately and uniformly according to the process of this invention that a selected flow velocity can be maintained with negligible turbulence and vertical circulation. The flow is consequently plug-type and thus enables a suitable flow velocity to be selected and maintained so that biodegradable solids can be suspended and, at the same flow velocity and within the same oxidation ditch, grit can be selectively settled and removed. Such velocity-control capability enables this invention to be useful for both open-surface oxidation ditches and enclosed pipeline or continuous flow systems, either above or below grade.

Moreover, the gas-transfer characteristics can be controlled so accurately and independently that a selected dissolved-oxygen content can be maintained at such selected flow velocity without periodic interference therewith. Means are accordingly provided in the oxidation ditches and continuous flow systems of this invention for utilizing this uniform and laminar flow and this independently selectable gas transference so that grit is settled and removed within a circuit-flow oxidation ditch or a continuous-flow system without disturbing the aerobic activity therein.

A directional-flow intake means is also provided for static aerators so that the flow energy of the liquid which is approaching the barrier means is conserved, concentrated, and utilized within the static aerators to obtain more vigorous mixing of liquid and gas. Moreover, a directional-flow discharge means is additionally provided for static aerators so that the flow energy in the gas-liquid mixture being discharged from the static aerators is utilized to produce useful translational movement of the discharged liquid, thus augmenting the flow energy produced by the differential head.

If no directional outlets are attached to the static aerators, they are preferably arranged along a barrier in a regular array. With such directional outlets attached, they are preferably arranged in a staggered array in order to minimize interferences and consequent turbulence among the discharged streams.

A gas-delivery apparatus is further provided for use with either array of static aerators so that a gas, such as compressed air or oxygen, can be delivered from a single header which is controlled by a single valve. Operation of this valve not ony enables gas transference to be selectively maintained but also enables to very large mass of liquid within an oxidation ditch, for example, to be selectively put in motion or selectively stilled for clarifying, settling suspended solids, and removing sludge. This gas-delivery apparatus can be submerged within the intake body of liquid, as is generally known in the art, or it can be disposed overhead with downflow gas delivery lines, each equipped with a control valve, leading to the intakes of the static aerators. Each downflow gas delivery line is preferably coaxially disposed within each static aerator. However, it is also suitable to attach a downflow gas delivery line to the tubular shell, either inside or outside thereof, of a static aerator.

With such clarifying and sludge-removal capabilities, an oxidation ditch can function as the sole treatment facility for a wastewater system, except for storage requirements, particularly if two or more oxidation ditches are rotatively operable so that intermittent clarification and partial sludge removal occur in one of the oxidation ditches while grit settling and removal and aerobic digestion continue in the other oxidation ditches.

Moreover, the oxidation ditches of this invention can provide storage capacity and hence are additionally useful for flow equalization of incoming wastewaters. If the aeration means is a plurality of static aerators, the discharge body of the liquid above the barrier means is provided according to this invention with two or more feet of variable depth so that the surface of the entire oxidation ditch can be raised or lowered by this variable depth, whereby a large amount of liquid can be stored and highly variable flows can be equalized. If the aeration means is a surface aerator, this invention additionally provides a telescopic mounting means for attachment of a floatmounted surface aerator to the barrier means and, in combination therewith, sufficient depth in the discharge body for the surface of the entire oxidation ditch to be correspondingly raised or lowered for flow equalization and storage.

Thus this invention provides apparatuses and methods that are capable of handling all wastewater effluent from a major source by sequentially operating a plurality of oxidation ditches of this invention as follows: (A) intermittently clarifying within and partially removing sludge from one oxidation ditch; (B) simultaneously and continuously settling and removing grit from and aerobically digesting within the remaining oxidation ditches; and (V) simultaneously but intermittently varying the surface levels within the remaining oxidation ditches in response to variations in flows of raw wastewater influent to provide storage and equalization of the flows from the major source.

With a known volumetric flow rate of wastewater from a source of wastewater, such as a municipality, a poultry processing plant, a fruit cannery, a paper mill, or a slaughter-house, for example, an oxidation ditch is designed according to this invention according to the following steps:

A. determine the number of aerators required for oxygen transfer.

B. determine the circuit channel flow rate by multiplying the flow pumping rate of a selected aerator times the number of aerators determined in Step A.

C. multiply the number of aerators by the power requirements of each static aerator to obtain the total horsepower requirements for aeration.

D. dividing the volumetric flow rate by the desired linear flow rate (within the range of 0.75–1.25 ft/sec), that will provide both settling of grit and suspension of biogradable solids, to obtain the needed cross-sectional area of the flow channel, and E. according to economic factors, determining the width and depth of the flow channel.

Unlike other closed-loop circuit systems, this invention provides the only closed-circuit liquid treatment system. in which a major portion of the reactor basin can be composed of full flowing or partially full flowing pipelines or conduits installed above or below grade and constructed of metal, concrete, fiberglass, or other material pipe or conduit sections that can be shop or field assembled and field connected in reduced time and at reduced-cost when compared to field erected concrete or steel tankage presently used in the construction of waste treatment aeration basins. Furthermore, unlike existing closed-loop circuit treatment systems used solely for sewage purification by the activated sludge treatment method wherein air and oxygen is added to the sewage by means of impeller-type surface aerators, horizontal brush-shaped surface aerators, or submerged ejector-type aerators, installations designed according to this invention can be adapted for gas transfer and process mixing use in many water, waste and other liquid treatment processes such as chlorine contact disinfection-post aeration, chemical flocculation, aerated grit removal, aerated flow equalization, activated sludge aeration, extended aeration, flow equalization in combination with activated sludge or extended aeration, aerated grit removal in combination with activated sludge or extended aeration, flow equalization and aerated grit removal in combination with activated sludge or extended aeration, aerated granular or powdered activated carbon contact for soluble organic pollutant removal, and aerated lagoon aeration. In addition, the flow-control apparatuses and methods of this invention are useful for fish farming and shrimp farming, for leaching processes involving mineral ores in slurry form, and for chemical processes involving slurries (such as by absorption of gases to react with a solute and create a precipitated slurry). Installations according to this invention have a minimum capacity limitation of about 5,000 gallons per day and no maximum capacity limitation.

BRIEF DESCRIPTION OF THE DRAWINGS

FIG. 20 is a perspective view of an exemplary grit-removing means for use with the grit-trapping means of FIG. 19.

FIG. 21 is a plan view of a staggered array of static aerators having directional outlets.

FIG. 22 is a perspective view of a gas-delivering header system for the staggered array of static aerators with directional outlets of FIG. 21.

FIG. 25 is an elevation view along one end of the continuous-flow system of FIG. 23, taken along the line of 25—25 of FIG. 23.

FIG. 27 is a plan view of a closed-circuit oxidation ditch for treatment of wate liquors, having at one end a differential-head device which comprises a horizontally disposed barrier and several banks of vertically disposed static aerators suspended from the barrier, in a discharge body of liquid being above the barrier and flowing away therefrom and an intake body of liquid being below the barrier and flowing towards it, so that the ditch may be described as having an intake side and a discharge side.

FIG. 28 is a sectional elevation through the differential-head apparatus of FIG. 26 and taken along the line 28—28 of FIG. 27 through the discharge side.

FIG. 29 is a sectional elevation taken along the line 29—29 of FIG. 27 through the intake side.

FIG. 30 is a sectional elevation across both intake and discharge sides of the oxidation ditch of FIG. 27, taken along the line 30—30 therein, and looking toward the differential-head apparatus.

FIG. 31 is a plan view of an oxidation ditch having a differential-head apparatus, comprising a horizontally disposed barrier and banks of static aerators suspended therefrom, which is arranged in one side of the ditch.

FIG. 32 is a longitudinal sectional elevation, taken on line 32—32 of FIG. 31, which shows the barrier and suspended static aerators therein.

DESCRIPTION OF THE PREFERRED EMBODIMENTS

FIGS. 1–4 show the existing state of the art for controlling the horizontal and vertical flows of liquid in aerobic wastewater treatment systems in which oxygen from a gas such as air or tonnage oxygen is dissolved in the wastewater by agitating its surface or by subsurface mixing of liquid with finely dispersed gas.

FIGS. 5–10, 15, 17, 18, and 26–35 relate to static aerators in combination with a barrier, having at least a portion that is horizontally disposed where attached to the static aerators, as a differential-head producing means.

Figure 11:
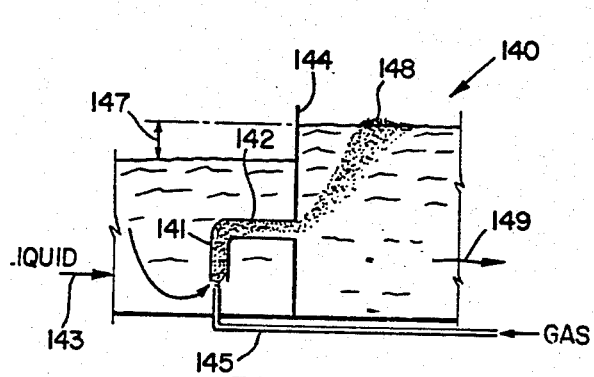
FIG. 11 represents a section of a flowing liquid system having a vertically disposed barrier which is penetrated by a static aerator having both horizontal and vertical parts which are entirely in the intake portion of the liquid.
Figure 12:
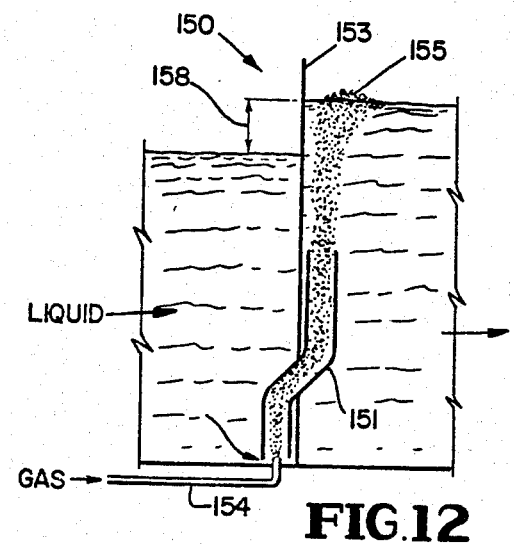
FIG. 12 represents a section of a flowing liquid system having a vertically disposed barrier which is penetrated by a static aerator having two vertical parts and an S-turn therebetween, half of the aerator being in the intake body and half in the discharge body of the liquid.
Figure 15:
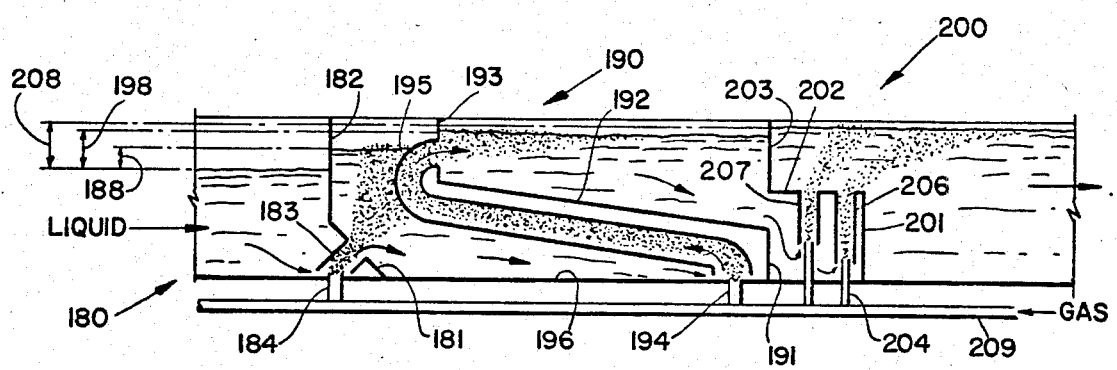
FIG. 15 shows an elevational cross section of a flowing liquid treatment system having three sequentially arranged barriers and gas absorption devices of differing tubular types which cumulatively produce a series of differential heads.

FIGS. 11, 12, and 15 relate to static aerators in combination with a barrier that is vertically disposed, at least where attached to the static aerators, as a differential-head producing means.

FIGS. 13, 14, 15, and 16 relate to static aerators in combination with a barrier that is obliquely disposed, at least where attached to the static aerators, as a differential-head producing means.

FIGS. 17, 18, 21, 22, and 27–37 relate to closed-loop treatment systems using a differential-head producing means comprising banks of static aerators.

FIGS. 23–26 relate to continuous-flow systems using a differential-head producing means comprising banks of static aerators.

FIGS. 39–45 relate to closed-loop treatment systems using a differential-head producing means with impeller aerators.

Figure 5:
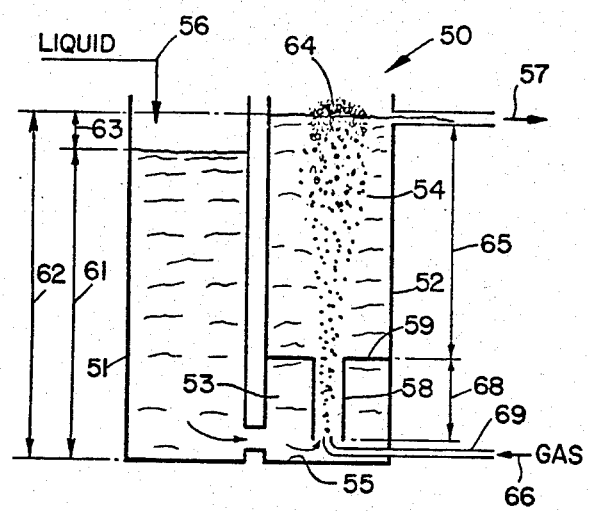
FIG. 5 is a view in elevation of a two-vessel treatment system constructed according to this invention and having a horizontally disposed barrier which is penetrated by a vertically disposed static aerator connecting an intake body of liquid to a discharge body of liquid for producing a differential head therebetween.

A differential-head producing means 50 is shown in FIG. 5 in which a first vessel 51 is connected at its bottom to a second vessel 52. Feed liquid 56 continuously enters vessel 51 and passes into the lower part of vessel 52, where it forms an intake body 53. The second vessel 52 has a horizontally disposed barrier 59 therein whih separates intake body or pool 53 from discharge body or pool 54 of the liquid being treated. A static aerator 58 is sealably attached to barrier 59 and is suspended therefrom so that it protrudes into intake body 53 and extends almost to the bottom 55 thereof.

A gas 66 enters an inlet pripe 69 and is fed into the bottom of static aerator 68 through a bubble-producing means so that it entrains the liquid in intake body 53 and at least partially dissolves therein as both liquid and gas pass through static aerator 68 and continue upward as a bubbly stream which forms a boil 64 at the surface thereof. Intake body 53 has head 61, and discharge body 54 has head 62. The difference therebetween is differential head 63 which is produced by the static mixer-and-barrier combination of this invention. Static aerator 58 functions as an energy-imparting and gas-dissolving means through aerator distance 68, and gas 66 dissolves in the liquid above barrier 59 through distance 66 plus free-rise distance 65. The energy in the compressed air 66 is thus imparted to the liquid 56 to create the pressure energy in differential head 63 and to cause gas to be absorbed in the liquid.

The static aerator 58 is essentially a gas-liquid contacting means within a passageway connecting the intake and discharge bodies 53 and 54, respectively, and through which the liquid must pass. The preferred form of static aerator is a plurality of twisted ribbonlike strips, alternatively first disposed clockwise and then directed counterclockwise.

If the pumping action of gas 66 through static aerator 58 were not available, differential head 63 would be a negative head, i.e., head 62 would be less than head 61, representing an energy loss suffered by liquid 56 in passing through the connection between the vessels 51 and 52 and through the static aerator 58. The differential-head producing means 50 of this invention, therefore, overcomes the head-consuming friction represented by a normally encountered negative head and additionally produces differential head 63 which provides a hydraulic gradient that is useful for doing productive work, such as causing the liquid 56, now containing an absorbed portion of gas 66, to flow transversely from vessel 52 as liquid 57. The differential head may be scarcely perceptible in a large channel having relatively few aerators but nevertheless functions as herein described. Generally, the differential head in an oxidation ditch is one to a few inches high.

Figure 6:
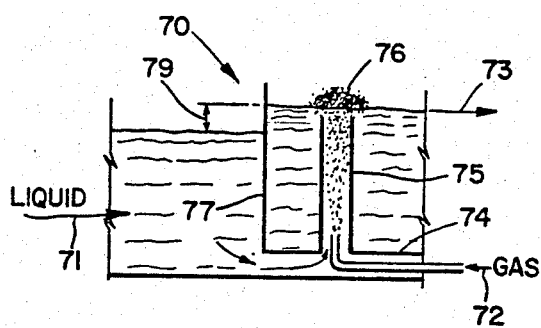
FIG. 6 represents a section in elevation of a flowing liquid system having a barrier between an intake portion and a discharge portion, at least part of the barrier being horizontally disposed and attached to and penetrated by a static aerator which extends thereabove almost to the surface of the discharge portion.

In FIG. 6, a section of flow system is shown. In this flow system is a differential-head producing means which comprises a barrier and a static aerator which is disposed entirely within the discharge body of the liquid. The barrier has a vertically disposed portion 77 and a horizontally disposed portion 74 which is penetrated by and sealably attached to the lower end of static aerator 75 which extends almost to the surface of the discharge body of the liquid.

Incoming liquid 71 forms the source or intake body of liquid, passes beneath horizontal portion 74 of the barrier, and is entrained by gas 72 diffusing from the inner tube at the bottom of static aerator 75. Gas absorption and channeling of the liquid-gas mixture occurs throughout the length of static aerator 75, and a pronounced boil 76 develops at the surface of the discharge body. Differential head 79 drives the outgoing liquid 73 transversely away from barrier 77.

Figure 7:
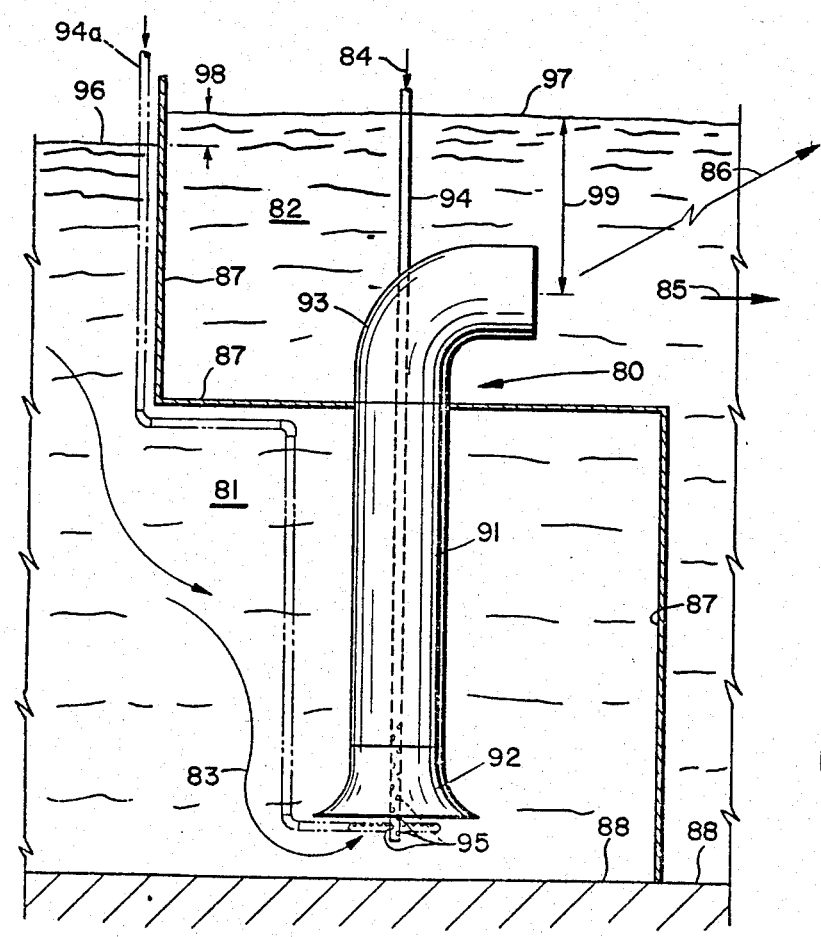
FIG. 7 is a view in elevation of a static aerator which is suspended from the horizontal portion of a barrier in a flowing liquid circuit, the aerator being equipped with an intake bell at its bottom, a directional outlet at its top, and a coaxial air delivery pipe to produce a differential head and flow energy.

FIG. 7 discloses a highly preferred embodiment of the invention in which the differential-head producing means 80 comprises a stepped barrier 87 and a static aerator 91 having an intake bell 92 at the lower end thereof and a directional outlet 93 at the upper end thereof to form a propulsion assembly, with a downflow gas delivery pipe 94 coaxially disposed and passing through the directional outlet 93 to the intake bell 92 and having diffusion holes 95 at its lower end for passage of incoming gas 84. The gas delivery pipe 94 can alternately be disposed along the wall of static aerator 91, either inside or outside thereof. Indeed, if the delivery pipe 94 is disposed outside of static aerator 91 and upstream of the upper vertical portion of stepped barrier 87 as downflow line 94a, so that it passes through surface 96 and, for example, terminates in a sparge ring disposed beneath intake bell 92, the entire gas delivery pipe 94 can be raised for inspection and repair without disturbing the stepped barrier 87 or the static aerator 91.

Intake bell 92 is close to the bottom 88 of the intake body of liquid 81, and the intake body 81 and the discharge body 82 are approximately equal in depth, having the same bottom 88. Incoming liquid 83 from the intake body 81 enters the intake bell 92, is entrained by gas passing through diffusion holes 95, moves up static aerator 91, and leaves directional outlet 93 to pass transversely and upwardly as stream 86 toward the surface 97. The differences between intake and discharge heads is differential head 98 and represents a driving force causing outgoing liquid 85 to move transversely away from the differential-head producing means 80.

Figure 8:
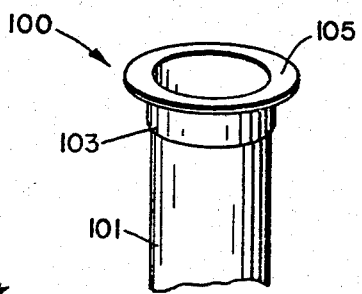
FIG. 8 is a perspective view of the upper part of a static aerator which is equipped with a collar and flange for suspending the aerator from a horizontally disposed barrier.

The attachment means 100 that is shown in FIG. 8 comprises a band 103, which is attached to the tube of static aerator 101, and a flange 105, attached to the band 103, with which a static aerator 101 can be suspended from and sealably attached to a barrier, whether or not the barrier is horizontally disposed.

Figure 9:
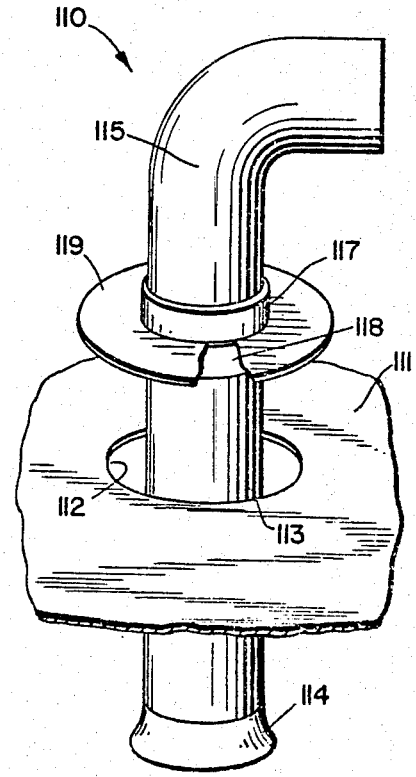
FIG. 9 is a perspective view of a static aerator having an intake bell and a directional outlet as in FIG. 7, with a double collar for attaching the outlet to the aerator and a wide flange for suspending the aerator and sealably covering the large hole in the barrier which permits the aerator to be lifted through the barrier.

In FIG. 9, an attachment means 110 is shown which comprises a double collar 117, 118 and a broad flange 119 which is rigidly attached to the collars and is wide enough to fit over a hole 112 in a barrier 111. The collars 117, 118, which are rigidly attached to the flange 119, are also rigidly attached to the tube of the static aerator 113 and to the delivery elbow 115 thereabove, thus joining static aerator 113 and elbow 115. The hole 112 is necessarily large enough to permit intake bell 114 to pass therethrough, so that the aerators 113, with bell 114 and elbow 115, can be bodily lifted upwardly and through the barrier 111 for inspection and repairs.

Figure 10:
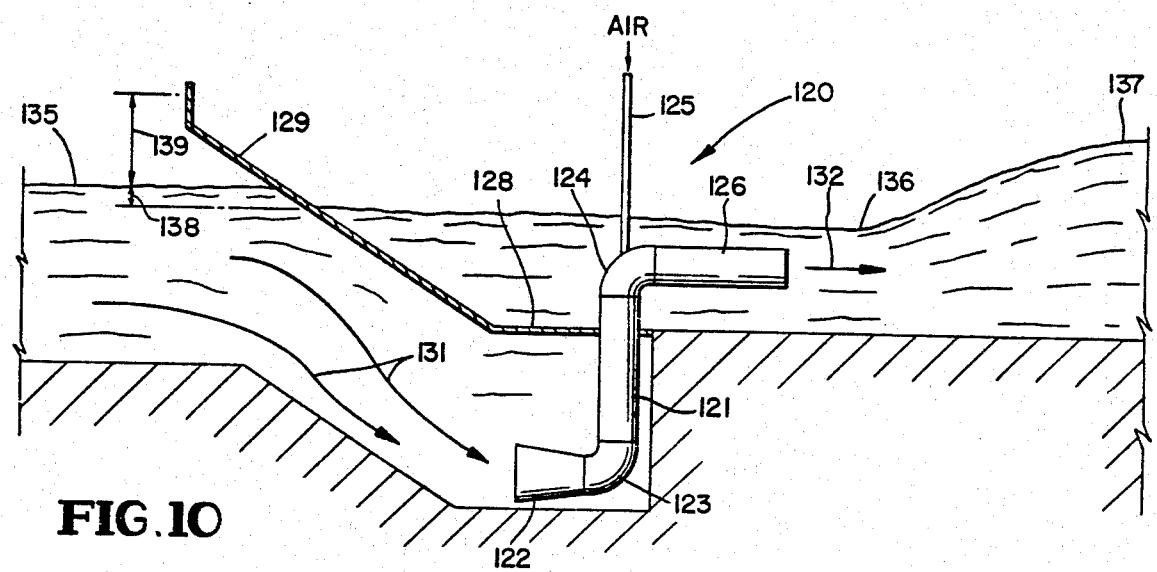
FIG. 10 is a sectional elevation through a flowing liquid system having a barrier which is partially inclined and partially horizontally disposed in combination with an aerator device using two static aerators, one being vertically disposed and one horizontally disposed, and further showing the negative psuedo head created by velocity energy.

FIG. 10 shows a section of a flowing liquid treatment system in which incoming liquid 131 being treated is guided downwardly by sloping portion 129 of a barrier of this invention into a depressed pool or body beneath horizontal portion 128 of this barrier. The liquid 131 then enters a static-aerator propulsion assembly 120, passes therethrough, and emerges as directed flow 132 to produce a depressed surface thereabove having velocity energy head 136 which is lower by negative pseudo head 130 than the intake head 135. Shortly thereafter, however, the velocity energy in the propelled and directed outgoing liquid stream 132 is dissipated into pressure energy, resulting in discharge head 137 which is greater than intake head 135 by positive differential head 139. This propulsion assembly 120, which may be arranged as a bank across the entire width of the channel, conserves existing flow energy and additionally directs at least a portion of its imparted energy as augmented flow energy for the liquid 132.

The static-aerator propulsion assembly 120 comprises an intake bell 122, elbow 123, a vertically disposed static aerator 121 which is suspended from and sealably attached to barrier 128, an elbow 124 through which passes a coaxial gas delivery pipe 125, and a horizontally disposed tube 126 which is selectively another aerator or an extension to increase liquidgas contact time and distance. The gas delivery pipe 125 is also suitably disposed, as in FIG. 7, along the periphery of static aerator 121, either inside or outside thereof, and is preferably attached to and disposed below sloping portion 129 of the barrier and then passes vertically downward to the mouth of intake bell 122 so that it can be raised for inspection and repair without interfering with the static aerator 121.

In FIG. 11 is illustrated a section of a flowing liquid system in which a liquid 143 enters a differential-head producing means of this invention and departs as a liquid 149. The differential-head producing means 140 comprises a vertically disposed barrier 144 and a static aerator comprising a vertical part 141 and a horizontal part 142 which is sealably attached to the barrier 144. A gas inlet pipe 145 delivers a finely dispersed gas to the static aerator from which it emerges to form a boil 148 on the surface of the intake body of liquid. One or both parts 141, 142 of the static aerator may be a static mixer device of the same or a different design or one part may be an empty tube. The differential-head producing means 140 creates differential head 147 which serves as a means of energy storage for transversely moving the liquid 149.

A differential-head producing means 150, shown in FIG. 12, comprises a vertical barrier 153 and an S-shaped static aerator 151 which is sealably attached to and on each side of the barrier 153. Finely divided gas from a gas inlet 154 enters the static aerator 151 and passed nearly vertically therethrough to produce a boil 155 on the surface of the discharge body of the liquid and a differential head 158 therein.

Figure 13:
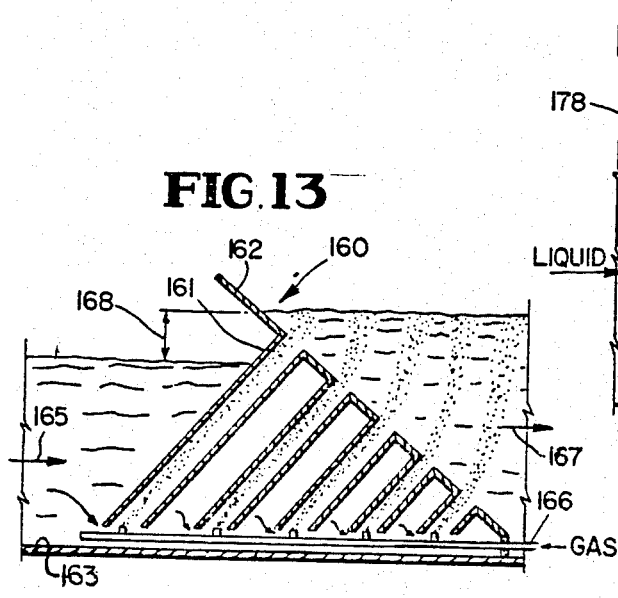
FIG. 13 shows a section of an oxidation ditch having an inclined barrier which is penetrated by five banks of static aerator tubes, all tubes being within the intake body of liquid and reaching to the bottom thereof.

A differential-head producing means 160, illustrated in FIG. 13, comprises an inclined barrier 162, extending from the bottom 163 oppositely to the directional flow of the incoming liquid 165. A plurality of static aerators 161, perpendicularly disposed to the barrier 162 and sealably connected thereto, extend almost to the bottom 163 and are fed by dispersed gas from a gas inlet pipe 166. The liquid 165 is entrained by the gas entering the static aerators 161 and then rises through the discharge body of liquid on the far side of the barrier 162, producing differential head 168 which imparts flow energy to outgoing liquid 167.

Figure 14:
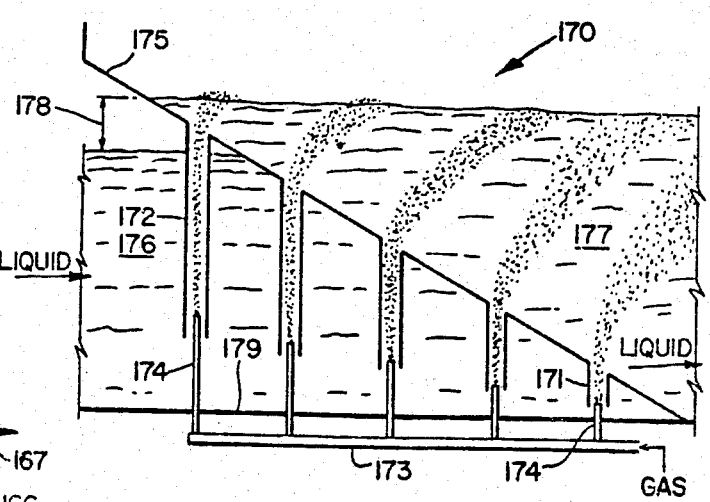
FIG. 14 represents a section of an oxidation ditch having an inclined barrier which is penetrated by five banks of vertically disposed static aerators which are all in the intake body and extend to differing depths therein.

In FIG. 14, another differential-head producing means 170 is shown which also comprises a rearwardly inclined barrier which is penetrated by a plurality of static aerators 171, 174, each aerator represented being typically a bank of aerators extending across the channel. These static aerators range from short tubes 171 to long tubes 172 but vary in proximity to the bottom 179 of the channel, the shorter aerators 171 approaching most closely and the longer aerators 172 being farthest above the bottom 179. Finely dispersed gas from gas inlets 174, each fed by gas delivery header 173, pass through the static aerators 171, 172 and through the discharge body of liquid 177, entraining liquid from the intake body of liquid 176 into the discharge body of liquid 177 to form differential head 178, thus furnishing flow energy to move the liquid transversely through the liquid treatment system.

FIG. 15 represents a liquid treatment system having three sequentially arranged means for producing a differential head, each being, for illustrative purposes, different in design but the differential heads produced by each being clearly cumulative. Beginning at the left side of FIG. 15, inclined barrier means 180 comprises a barrier having a vertically disposed portion 182 and an inclined portion 181 which is sealably connected to an inclined and perpendicularly disposed static mixer 183.

The middle part of the liquid treatment system shown in FIG. 15 comprises a differential-head producing means 190 having a barrier comprising a vertical portion 191 which is attached to the bottom 196 of the channel, an inclined portion 192, and the upper vertical portion 193 which is connected to a tubular static aerator 195 which is inclined in parallel to the inclined portion 192 and extends almost to the bottom 194, close to the bottom vertical portion 191. In this inclined static aerator 195, there is unusual opportunity for diffusion of gas into liquid through a lengthy contact tube while conserving length of channel.

A differential-head producing means 200 is shown on the right side of FIG. 15, comprising a barrier in three parts and a pair of static mixers. The barrier comprises a lower vertical portion 201, a horizontal portion 202, and an upper vertical portion 203. The static aerators 206 and 207 extend unequally to the bottom 194 and somewhat beyond the horizontal barrier 202 to which they are attached.

Into all of the static aerators, air inlets 184, 194, and 204 feed gas from a gas header 209. Entrained liquid in static aerators 183, 195, 206, 207 sequentially produce the cumulative differential heads 188, 198, and 208.

Figure 16:
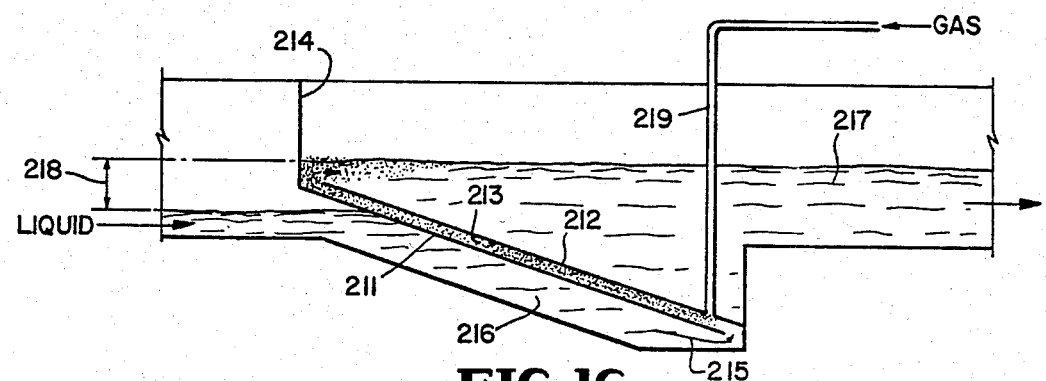
FIG. 16 shows an elevational cross section of a section of a flowing liquid treatment system in which the barrier, as a pair of opposed and spaced-apart sheets having a bubble-splitting means therebetween, forms a rearwardly inclined and sheet-like static aerator which is fed by an elevated gas-supply line.

A sheet or plate-type aerator assembly forms the differential-head producing means 210 of this invention within the section of the liquid treatment system illustrated in FIG. 16. This aerator assembly comprises a pair of sheets 211, 212 having a bubble splitting means 213 therewithin. Although this plate-type aerator assembly can be vertically disposed or inclined forwardly, it is shown as inclined rearwardly, against the direction of liquid flow, in order to conserve space and allow additional time for absorption of the gas by the entrained liquid. The bubble splitting means 213 is suitably a stainless-steel wool or wire packing, closely spaced platelets, or any other bubble-splitting device known to the art. Additional sheets can be added in parallel to and suitably spaced from sheets 211, 212.

Liquid 215 enters a slot in the lower plate 211 close to the bottom of the intake body 216, passes through the packing between the pair of barrier plates 211, 212 and emerges through a slot at the top of barrier 212 and at the bottom of vertical barrier 214 to enter the discharge body of liquid 217. Gas passes through the overhead gas inlet pipe 219 and enters at a plurality of closely spaced points through the upper barrier plate 212, near the bottom thereof, to entrain the liquid 215 and produce differential head 218.

Figure 17:
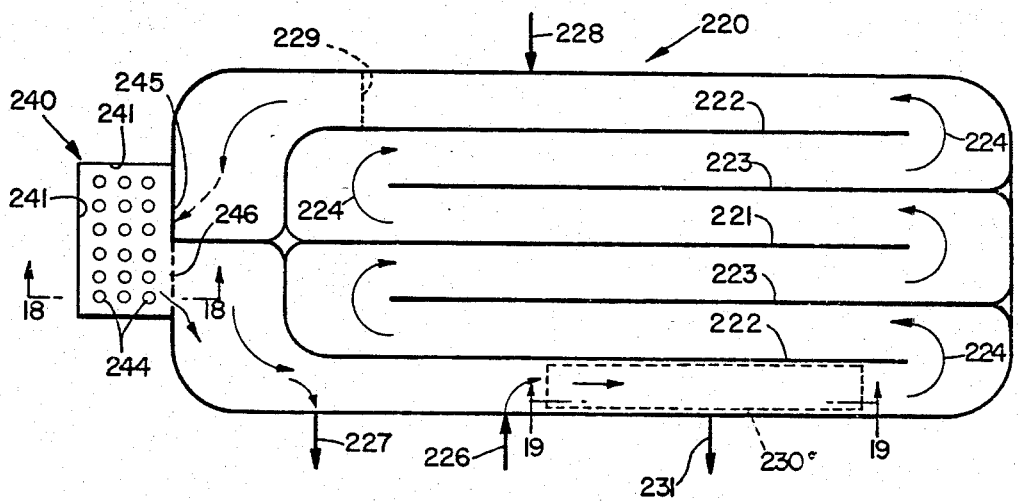
FIG. 17 is a plan view of an oxidation ditch having a plurality of longitudinally disposed partitions therein and which includes a grit-trapping means, denitrification portion, and an adjacent head-producing aeration means.

An aeration system 220 with flow-inducing partitions 221, 222, 223 is shown in FIG. 17. Central partition 221 extends from a differential-head producing means 240 at a first end of the basin and nearly to the other end thereof. A U-shaped partition 222 crosses central partition 221 and each of its arms also extends nearly to the other end. A pair of partial partitions 223 are spaced midway between central partition 221 and each arm of the U-shaped partition 222, being parallel to these partitions.

Figure 18:
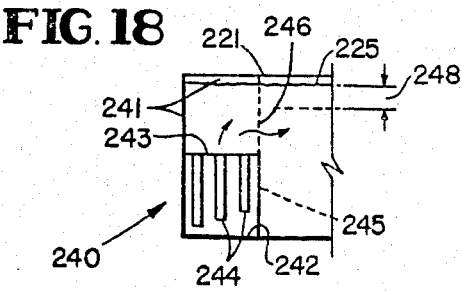
FIG. 18 is a cross-section in elevation of the barrier-type head-producing means of FIG. 17, taken on the line 18—18 of FIG. 17.

The differential-head producing means 240 is arranged so that its horizontally disposed barrier 243 supports an array of static aerators 244 and divides the contents of the rectangular chamber into a lower intake body and an upper discharge body. The intake body is connected to the contents of the basin 220 by a delivery inlet 245 on one side of partition 221, and the discharge body is connected to the contents of the aeration basin on the other side of partition 221 by the outlet 246, as shown in FIG. 18.

Incoming raw sewage 226 enters at one side of the seration system 220 into which an oxidation basin has been converted and soon passes over grit removal means 230. The sewage then makes five circular flows 224 around the ends of partitions 222, 223, 221, 223, 222. Grit outflow 231 is removed from grit. removal means 230. After the last circular flow 224, the sewage is substantially depleted of oxygen and incoming activated sludge 228 delivers large quantities of hungry bacteria which begin denitrification approximately at zone 229, ending at delivery inlet 245. The action of the static aerators 244, fed with air from air inlet lines which are not shown in the drawings, entrains sewage liquid therethrough and produces differential head 248 which furnishes the flow energy for moving the liquid around oxidation system 220 to inlet 245.

Figure 19:
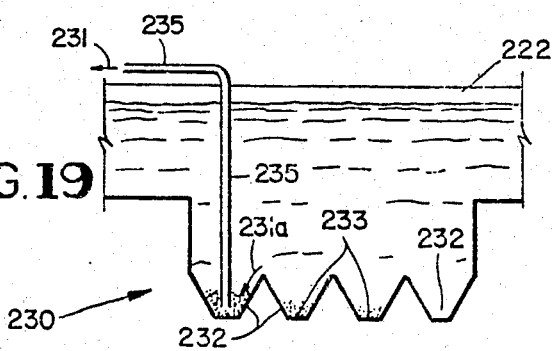
FIG. 19 is a cross-section in elevation of the grit-trapping means of FIG. 17, taken on the line 19—19 thereof.

FIG. 19 shows in section an exemplary grit removal device 230 having a plurality of pockets 232 into which grit 233 falls by gravity as the incoming sewage flows thereover. A manually removable pipe 235 sucks grit 231a thereinto which becomes grit outflow 231, as indicated in FIG. 17.

Another suitable grit-removal device is illustrated in FIG. 20 in which a gravity flow line 236 receives grit from a grit pocket 232, leads to a grit valve 237 which is operated by a manual valve handle 239, and drains into a grit standpipe 238.

The static aerators 244 which are attached to the barrier 243 in FIG. 17 are arranged in regular rectangular array and are vertical tubes such as aerator 58 in FIG. 5, aerator 75 in FIG. 6, or aerators 204, 206 in FIG. 15. For static aerators with directional outlets 93 in FIG. 7, delivery elbows 115 in FIG. 9, or elbows 124 with horizontal static aerators 126 in FIG. 10, however, it is preferable to use the staggered array which is illustrated in FIG. 21 in such a differential-head apparatus 240 of FIG. 17 for static aerators 256 producing directed flows 255. Ther barrier 251 of FIG. 21 has holes 252 which are separated by spacings 253, 254, and the flows 255 are directed to provide minimum interference from nearby static aerators 256.

Figure 1:
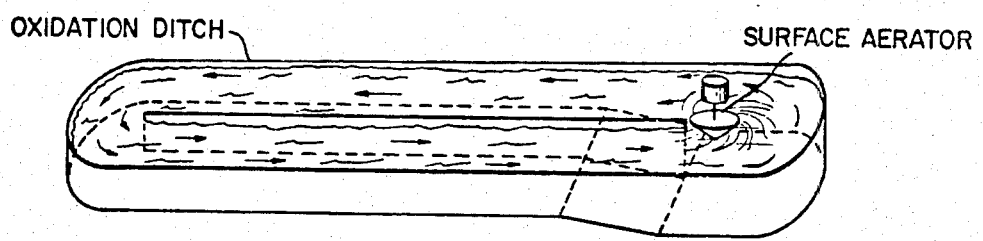
FIG. 1 shows an oxidation ditch of the prior art having a longitudinally disposed partition and a surface aerator, rotating about a vertical axis, which is arranged at one end of the partition for aerobic treatment of sewage, somewhat as disclosed in U.S. Pat. No. 3,510,110.
Figure 2:
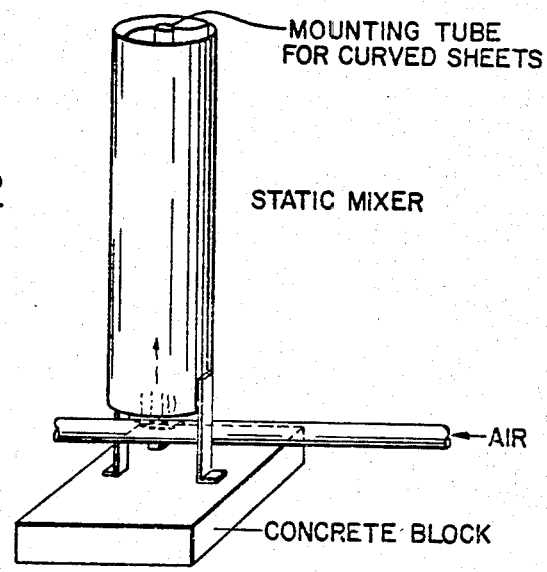
FIG. 2 shows a static aerator of the prior art, comprising a tube having curved sheet-like elements therewithin which are attached to a central mounting shaft, as disclosed in U.S. Pat. Nos. 3,664,638 and 3,794,300, the tube being attached to a concrete block for positioning in a body of liquid to be aerated.
Figure 3:
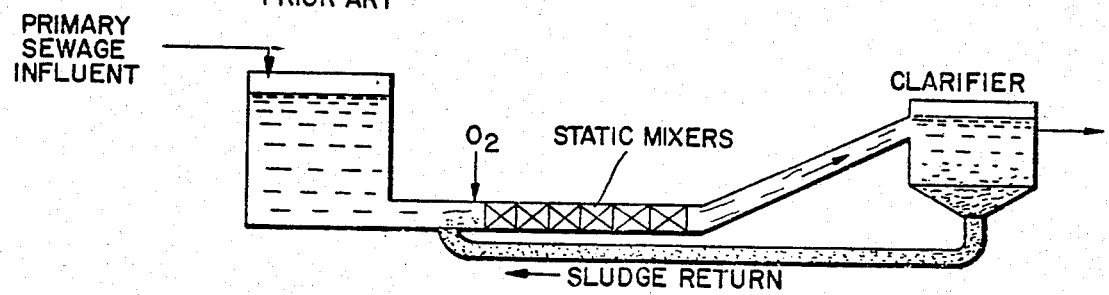
FIG. 3 shows a sewage treatment system of the prior art employing horizontally disposed static aerators as an underground pipeline reactor for mixing oxygen with deaerated sewage and recycled activated sludge while these liquids are enroute to a clarifier, as taught in U.S. Pat. No. 3,607,735.
Figure 4:
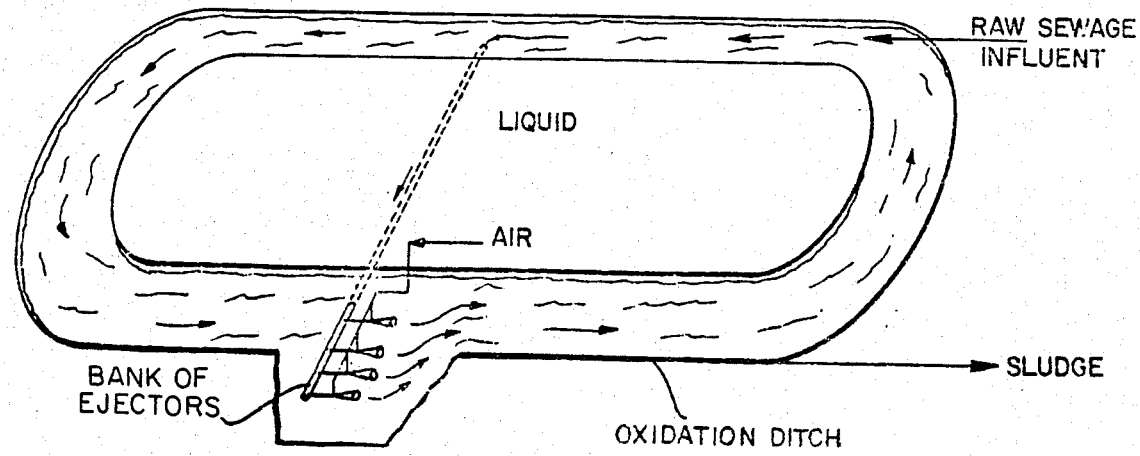
FIG. 4 shows an aerated oxidation ditch of the prior art in which a bank of ejectors is mounted at considerable depth to aerate a liquid and act as the sole propelling force for moving the liquid around the ditch in a closed-loop circuit, as taught in U.S. Pat. No. 3,846,292.

For either a regular or a staggered array of static aerators, a preferred apparatus 250 for delivering a gas, such as air, to the aerators is shown in FIG. 22 where a barrier 251 is equipped with directional-outlet aerators 256, each aerator 256, if constructed as in FIG. 2, being fed with compressed gas through a coaxially disposed downflow line 257 delivering compressed gas to the hollow shaft in its center. Air moves through main header 259 and valve 259v to the plurality of single-bank headers 258 with valves 258v to the downflow lines 257, each having a valve 257v. The valves 259v, 258v, 257v enable any static aerator 256 to be individually checked, removed, repaired, or replaced with negligible disturbance of the system. Moreover, the main valve 259v enables the mass of wastewater in the flow channel to be readily accelerated or decelerated because the restricted passageway represented by static reactors or draft tubes without aeration pumping soon slows the flow of wastewater therethrough when the air is shut off.

Figure 23:
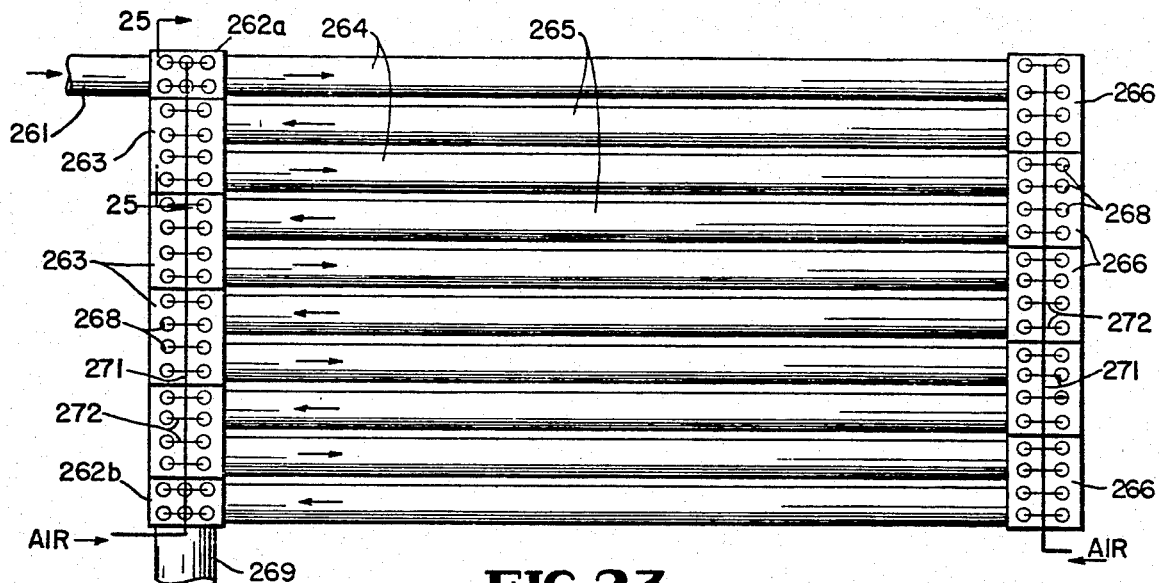
FIG. 23 is a continuous-flow liquid-treatment system having means for repeated gas absorption treatment in a pair of rows of differential-head devices of submerged static aerators between which the liquid shuttles.
Figure 24:
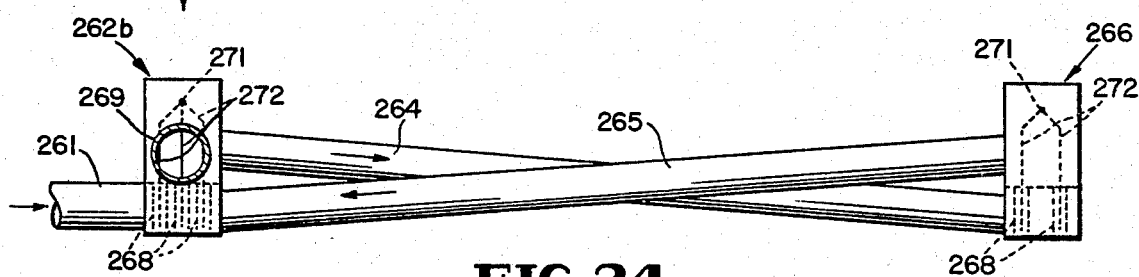
FIG. 24 is an elevation view along one side of the continuous-flow system of FIG. 23, taken on the line 24—24 of FIG. 23.

Continuous-flow pipeline systems for liquid treatment are illustrated in FIGS. 23-26. The zigzag or folded system 260 fo FIGS. 23-25 is adapted for use on a compact plot and permits light construction, such as warehouses, thereabove. The linear system 340 of FIG. 26 conveys treated liquid to a destination. Both folded and linear continuous-flow systems essentially comprise a plurality of reaction-pipe sections and a plurality of differential-head apparatuses which are each interconnected to and between two of the reaction-pipe sections. According to the hilliness of the terrain, each reaction pipe can be selectively inclined or can be connected to the discharge body and the intake body of the differential-head apparatuses at its intake and discharge ends, respectively, with inclines or declines of selected steepness.

The continuous-flow system 260 comprises crisscrossed pairs of slightly inclined reaction pipes 264, 265 and a pair of rows of side-delivery differential-head apparatuses 263, 266 at the ends of the pipes 264, 265 in addition to vertical-delivery differential-head apparatuses 262a, 262b at the inlet and outlet of the system 260, respectively.

Raw sewage flows through inlet pipe 261 into the intake body of pool 274 in the initial vertical-delivery differential-head apparatus 262a and flows upwardly through static aerators 268.

The discharge of each pipe 264 enters the intake body 274 of each apparatus 263, 266, 262b, and the aerated liquid in each discharge pool 275 enters the inlet of each pipe 264, 265 after having received dissolved gas, such as oxygen, from passage through the static aerators 268 in which a gas, such as air, flows from downflow lines 272 which are fed from gas headers 271, as most clearly shown in FIG. 25. The last pipe 265 enters the intake body in differential-head apparatus 262b so that liquid, which has been aerated in eight apparatuses 263, 266 and in two apparatuses 262a, 262b, leaves the discharge pool in final device 262b through outlet pipe 269 which can be oriented in any direction.

The system of FIGS. 23–25 is designed to handle a given flow of rae sewage per day at one foot per second when constructed of pipes 261, 264, 265, 269 having a 9-foot diameter, with pipes 264, 265 being 1,200 feet in length. The differential-head apparatuses 262a, 263, 266, 262b are conveniently open to the atmosphere. The differential head in each apparatus 262a, 263, 266, 262b, represented by liquid surfaces 277 in FIG. 25, furnishes the driving force for moving the sewage through the next pipe 264 or 265. The residence time is about four hours, and the flow-through time is approximately 22 minutes between aerations.

Figure 26:
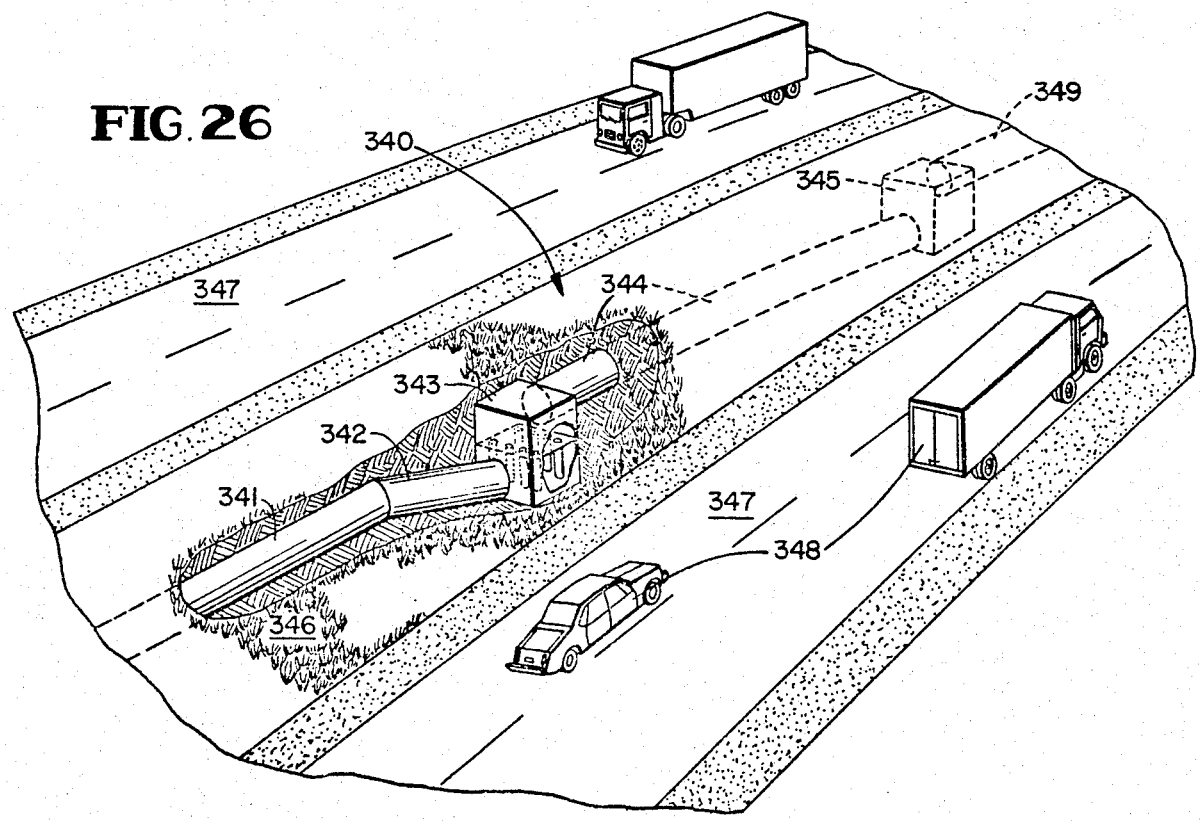
FIG. 26 is a perspective sketch of a section of a continuous-flow pipeline system for treating wastewater along the median of an interstate highway.

The continuous-flow system 340, a section of which is illustrated in FIG. 26, is conveniently embedded in the median 346 of an interstate highway having paved roads 347 and vehicular traffic 348. A horizontal pipe 341 is connected to a steeply inclined pipe 342 which is attached to the intake portion of a differential-head device 343. A slightly inclined pipe 344 is connected to the discharge portion of the apparatus 343 and is in turn connected to the intake portion of the differential-head apparatus 345. Another pipe 349 is connected to the discharge portion of apparatus 345. Continuing in this manner, the system 340 can pass through level and even slightly rolling country from a municipality to a disposal plant, such as a chlorination plant and an activated-carbon polishing plant employing static aerators in a differential-head apparatus of this invention. The highly purified effluent is then discharged into a natural body of water, such as a lake or river.

The closed-circuit oxidation ditch 280 which is shown in FIGS. 27–30 comprises a U-shaped flow channel, having sides 281, a bottom 283, a central partition 282, and a square aeration pumping apparatus 290 at one end opposite to the semicircular end. As clearly seen in FIG. 29, the bottom 283 begins at 284 to decline sharply to meet bottom 298 of the intake body beneath horizontal barrier 292 which is sealably attached to vertical barrier 291 which extends across the intake channel, from one side 281 to the end of the partition 282, and which continues across the discharge channel as submerged side 295 of the intake body.

An array of static aerators 293 is sealably attached to and suspended from the horizontal barrier 292 and extends nearly to the bottom 298. Some of the static aerators 293 are shown with bottom supports 294 as alternative but not preferred supports.

Raw sewage 301 enters the oxidation ditch 280, at a point subsequent to the aeration pumping apparatus 290 and subsequent to the outflow 306 of digested sewage, and joins the aerated sewage to form flow 302 which is joined by inflow 304 of activated sludge. The mixture of aerated sewage, raw sewage, and sludge moves past circular flow baffle 286 to become oxygen-depleted flow 303. Circular flow baffle 286, as is known in the art, promotes uniform, plug-type flow around the semi-circular end.

The locations of the outflow 306, raw sewage influent 301, and sludge inflow 304 are not critical. The outflow 306 can indeed be located along any of the three outer sides of the discharge body above horizontal barrier 292, and the influent 301 can be located anywhere along the sides 291 and 281 that avoids backmixing with the outflow 306, but it is desirable to locate it reasonably close to or within the aeration pumping apparatus 290. The hydraulic gradient or differential head 309, shown by the drop from the liquid surface of the discharge body to the liquid surface of the approach to the intake body, represents hydraulic friction (energy loss) encountered during circuit flow around the oxidation ditch.

After mixing with sludge inflow 304, nitrates are broken down to supply oxygen, and nitrogen is liberated. This denitrification continues until the flow 303, having intake head 307, enters the static aerators 293 wherein an air delivery line (not shown in FIGS. 27–30) discharges finely dispersed air to pump the liquid upwardly as flow 305 and form discharge head 308 which is greater by differential head 309 than intake head 307. The potential energy in differential head 309 is gradually converted to flow energy which moves the liquid in the discharge body as flows 302, 303 within the channels of the oxidation ditch 280.

EXAMPLE

The following design calculations are for an oxidation ditch having a channel width of 10.5 feet and depth of 10 feet and a flow capacity of one million gallons per day of wastewater with 250 mg/l BOD(5), 250 mg/l suspended solids, and 30 mg/l $NH_3$-Nitrogen, using static aerators for air-lift pumping.

(1) Oxygen requirements=1.5#$O_2$/#BOD(5) applied +4.6 #$O_2$/#$NH_3$—N converted to nitrate nitrogen.
(2) Aeration basin design criteria:
  (a) MLSS (Mixed liquor suspended solids)=4,000 mg/liter
  (b) Food-to-microorganism ratio=0.05 # BOD/#MLSS (Mixed liquor suspended solids)
  (c) Oxygen transfer efficiency correction factor at 21° C. to standard condition oxygen transfer requirements=1.40 for process condition oxygen transfer requirements.
(3) Typical system design
  (a) Oxygen demand at process conditions=178.3 #$O_2$/hour
  (b) Oxygen demand at standard conditions=249.6 $O_2$/hour
  (c) Number of aerators for an aeration-pumping unit operating depth of 20.0 feet at 25 scfm (Standard Cubic Feet per Minute of air per aerator—from manufacturer)=60 units (d) Total pumping rate at pumping rate per static aerator of about 800 gpm (from manufacturer)=48,000 gpm=107 cfs (e) Barrier Dimensions, using aeration-pumping barrier as platform for 60 aerators in four rows of seven units and four rows of eight units, all four feet apart on center in regular array, is 32 feet square.

(f) Estimated Brake Horsepower for 60 aerators at 25 scfm per aerator in 20 feet water depth=73.2 HP.

(4) Design of aeration basin
  (a) Volume=1.25 million gallons=167,089 ft$^3$
  (b) Cross Sectional Area of closed circuit channel=107 ft$^2$
  (c) Velocity in channel having depth of 10.0 feet and width of 10.5 feet=1.02 fps
  (d) Channel Length=1,591 feet
  (e) Time for Flow to pass around closed circuit=26 minutes.

Figure 33:
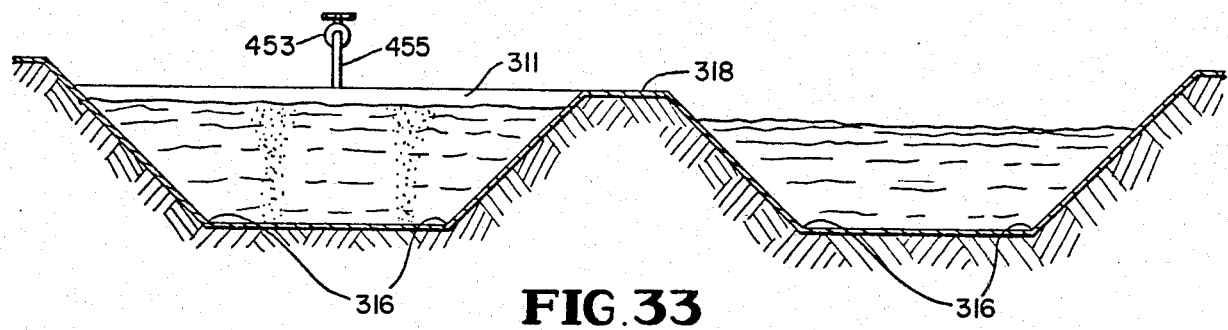
FIG. 33 is a sectional elevation taken across both sides of the oxidation ditch of FIG. 31, taken along line 33—33 thereof.
Figure 34:
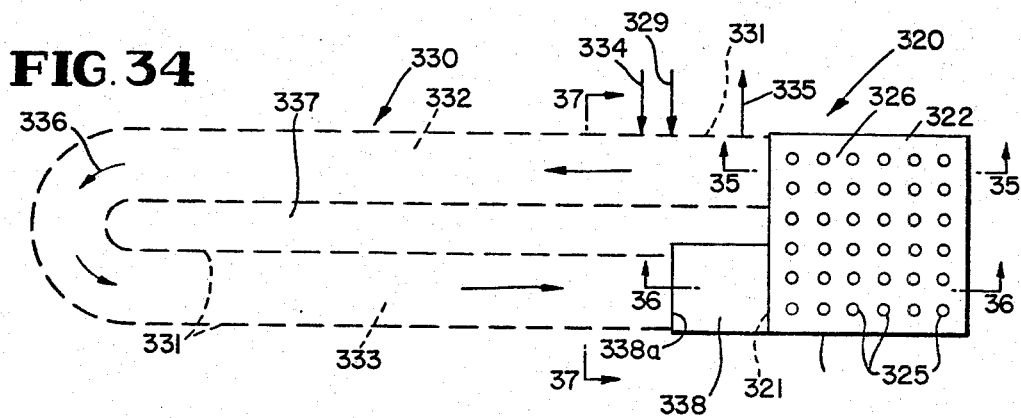
FIG. 34 is a plan view of an oxidation ditch formed of a U-shaped underground pipe with an exposed differential-head producing means, using a horizontally disposed barrier attached to a plurality of banks of static aerators at one end thereof to connect the pipe.
Figure 35:
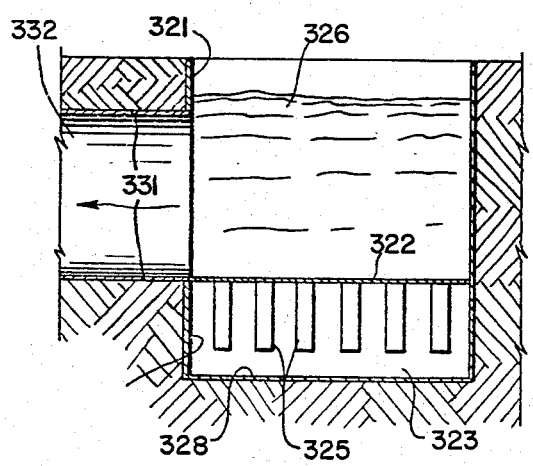
FIG. 35 is a sectional elevation through the differential-head producing means of FIG. 34, taken along the line 35—35 on the discharge side of the oxidation ditch.

The closed-circuit oxidation ditch 310 of FIGS. 31–33 is similar to the oxidation ditch 280 of FIGS. 27–30 except that the ovally laid-out flow channel has inclined sides with longitudinal bottom edges 316, earthern dividing strip 318, and a differential-head apparatus in one side channel. The slope for the sides, expressed as a horizontal:vertical-distance ratio, can be varied from 1:1 to 3:1. The flow of de-oxygenated wastewater moves down the decline having boundaries 317 as it meets vertical barrier 311 and forms the intake body beneath horizontal barrier 312, having intake bottom 314 and end 315. Static aerators 313 are sealably attached to and suspended from barrier 312. The liquid is air-lift pumped through the differential-head device to produce differential head 319 which provides the driving force for moving the liquid transversely around the ditch. A portion of the aerated liquid is promptly removed, the remainder mixing with raw wastewater for aerobic digestion and with return sludge for denitrification.

Alternative gas delivery systems 450 are also illustrated in FIGS. 30–33. A main header 451 delivers compressed gas to header valve 452 which admits gas to the overhead header 454 having selecter valve 454 or to the upstream header 457 having selecter valve 456. Downflow lines 457 lead from overhead header 453 to a submerged header 458 which is also connected to upstream header 457. Feeder-sparge lines 459 deliver gas from submerged header 458 to the intakes of each static aerator 313. An operator is consequently able to select overhead delivery by opening valves 452 and 454 and closing valve 456 or to select submerged delivery by closing valve 454 and opening valves 452 and 456. When the operator closes valve 452, the entire mass of liquid in the oxidation ditch 310 is quickly slowed, as when beginning a clarification procedure. When valve 452 and either valve 453 or valve 456 are opened at the end of a clarification procedure, the mass of liquid in the entire oxidation ditch is rapidly set in motion because backflow through the barrier means 311, 312 is impossible.

A closed-circuit pipeline reactor 330 of FIGS. 34–37 is underground except for approach zone 338 and differential-head apparatus 320 at one end of the U-shaped pipe which is oval in cross section and has sides 331. One half is aeration pipe or channel 332 and the other half is return pipe or channel 333. The differential-head apparatus 320 comprises a horizontal barrier 322 and a sealably attached vertical barrier 321 which is submerged across its discharge side to channel 332 as merely a side of the intake body 323 beneath horizontal barrier 322 but which extends above the liquid level on the intake side along the approach zone 338. A plurality of static aerators 325 are sealably attached to and suspended from horizontal barrier 322, extending downwardly close to bottom 328 of intake body 323. In the approach zone 338, having one side 338a, an inclined bottom 339 connects pipeline sides 331 of intake channel 333 to bottom 328.

The oval sides 331 of the U-shaped pipe in FIGS. 34–37 represent an arch pipe section, but circular, rectangular, square, and other cross-sectional conduits or pipe sections are useful and practicable. Preferably, the closed-circuit pipeline reactor 330 operates under submerged inlet and outlet conditions with the channels 332, 333 completely filled under a low hydraulic head. However, submerged operation is not critical to the performance of the closed-circuit pipeline reactor 330 which can be successfully operate with non-submerged inlets and outlets and with channels 332, 333 partially filled.

Figure 36:
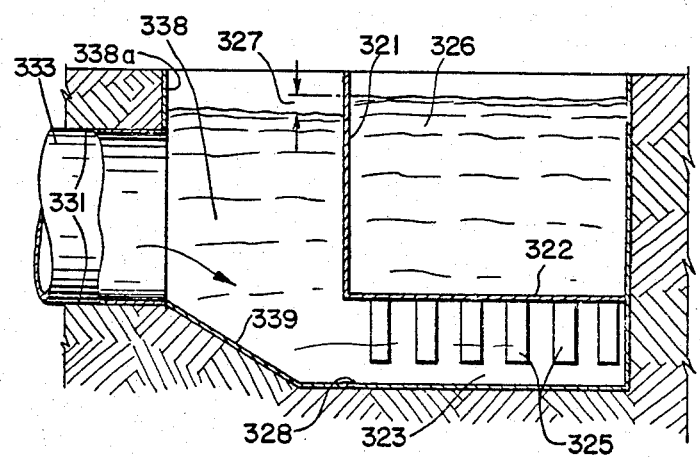
FIG. 36 is a sectional elevation, taken along the line 36—36 of FIG. 34 on the supply side of the oxidation ditch.
Figure 37:
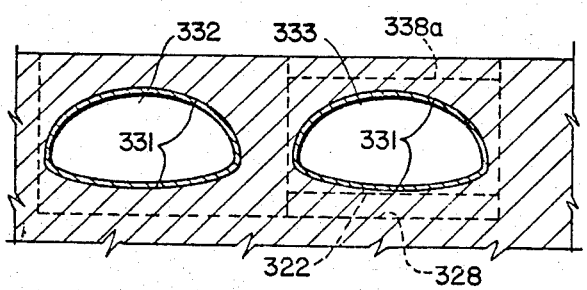
FIG. 37 is an elevational cross-section across both portions of the U-shaped pipe of FIG. 34, taken on the line 37—37 thereof.

Raw wastewater, such as municipal sewage or the process discharge waters of a poultry processing plant, a meat processing plant, or the like, enters pipeline reactor 330 as inlet 334, subsequent to sludge return 329, and mixes with the returned sludge and the aerated liquid in aeration channel 332. The mixed liquid moves around the end of island 337 as flow 336 and then moves through return channel 333 into approach zone 338 and intake body 323, passes through static aerators 325 with the assistance of air from delivery pipes (not shown in the drawings) into discharge body 326, and then enters aeration channel 332. A portion continually leaves as outlet 335. Flow energy for this movement is visibly provided by differential head 327, as indicated in FIG. 36.

Figure 38:
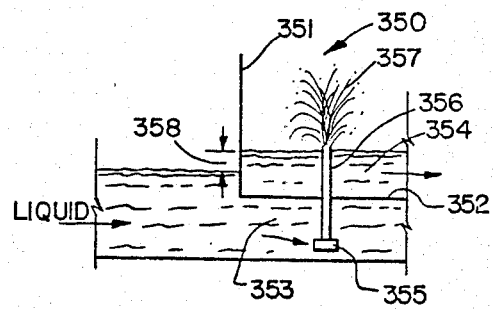
FIG. 38 is a sectional elevation through a liquid flow system having a barrier separating an intake body of liquid from a discharge body of liquid, with a horizontally disposed portion through which a vertically disposed pipe extends to the surface of the discharge body and is connected to a pump for creating a fountain and a differential head.

In FIG. 38, a fountain-aeration differential-head apparatus 350 is shown in sectional elevation as a section of an oxidation ditch. A vertical barrier 351 and a horizontal barrier 352 are sealably attached and extend across the entire channel of the oxidation ditch. A submerged pump 355 is disposed in intake body 353 at the intake end of fountain pipe 356 which passes through and is sealably attached to horizontal barrier 352. Fountain pipe 356 extends upwardly to and slightly beyond the surface of discharge body 354 so that spray 357 and differential head 358 are created by operation of pump 355.

This fountain-aeration apparatus 350 can be substituted for the static-aeration apparatus shown in FIGS. 27–37, but it is preferably used in situations where visual aesthetics have value, such as in apparatuses 343 and 345 of continuous-flow system 340 along an interstate highway.

Figure 39:
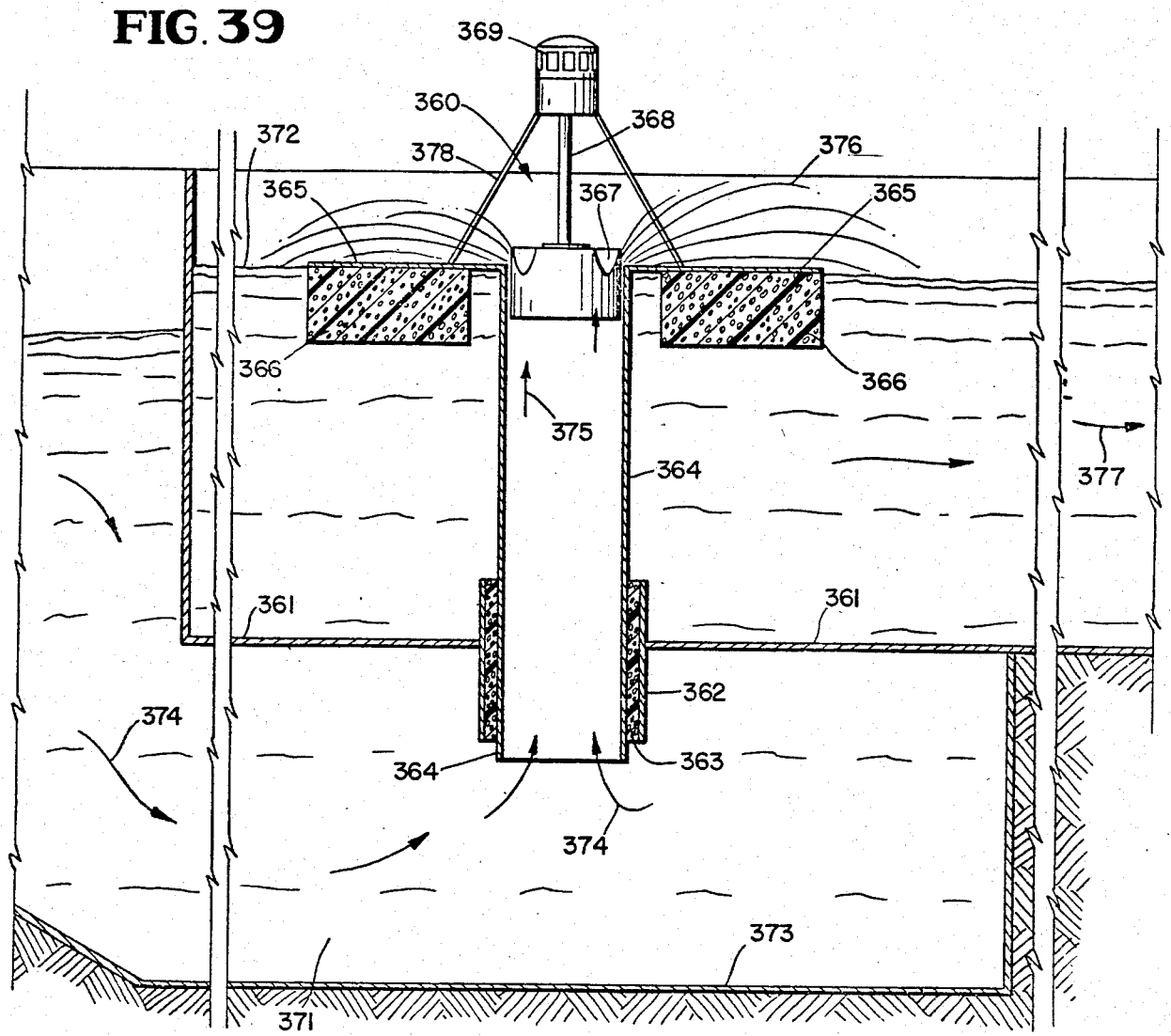
FIG. 39 is a sectional elevation across a differential-head apparatus of this invention comprising a draft tube which is slideably but sealably attached to a barrier with a floatation means at the upper end thereof and an impeller-type aerator operating within the draft tube at the surface of the discharge body of liquid.

In FIG. 39, a floating impeller aerator is shown in combination with a differential-head apparatus 360 having a horizontal barrier 361 which extends entirely across a channel, as in an oxidation ditch. A support tube 362 is sealably attached to barrier 361 and has a wear-resistant layer 363 of sealing material, such as a one-half inch thick layer of medium-density polyurethane foam, on its inner side. A float tube 364 slides telescopically within layer 363 and is rigidly attached to horizontal platform 365 which floats on the surface of discharge body 372 and is supported by a floatation means 366, such as rigid polystyrene foam.

A plurality of support struts 369a are attached to the upper surface of platform 365 and converge upwardly to a motor 369 which is centered above float tube 364. An impeller comprising scoop blades 367 is attached to impeller shaft 368, which is attached to and rotated by motor 369, and operates within float tube 364 at approximately the surface of discharge body 372. Thus this float-mounted impeller aerator moves freely upwardly and downwardly as the water level varies, and the impeller can additionally be varied by a few inches in relation to platform 365, as is known in the art, in response to variations in dissolved-oxygen content of the discharge water.

Incoming liquid 374 in intake body 371 enters tube 362 or 364 (whichever is lower), continues upwardly as upflowing liquid 375 through float tube 364 into the impeller and is flung outwardly as spray 376 onto the surface of discharge body 372. The aerated liquid 377 moves horizontally onward through the channel.

The differential-head apparatus 360 is useful in flow-type systems such as oxidation ditches and continuous-flow pipeline systems if flow equalization thereto is needed and surface levels are selectively varied to provide liquid storage therewithin. However, if flow equalization is not needed, the tube 364 can be rigidly attached to the barrier 361 as a conventional draft tube, with the weight of motor 369 and the impeller being borne by the floatation means 365, 366, not by the barrier 361.

Figure 40:
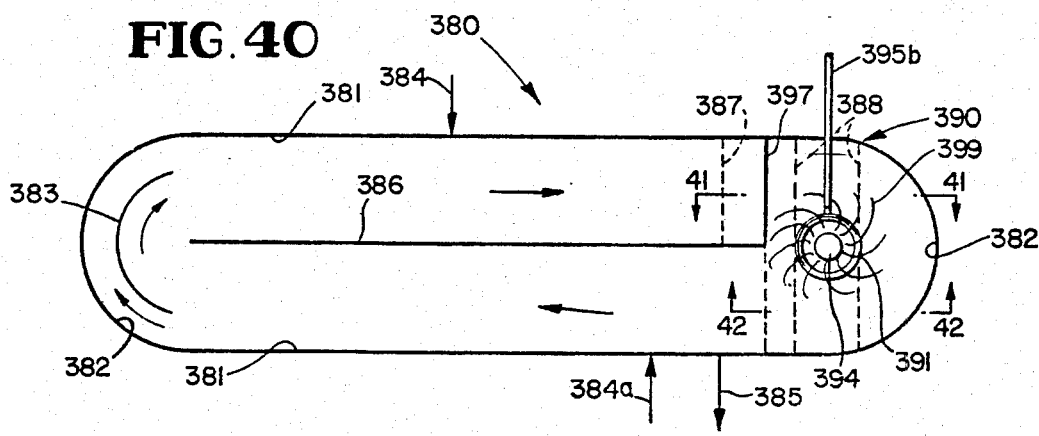
FIG. 40 is a plan view of a closed-circuit oxidation ditch having a submerged-turbine aerator, creating a differential head through a horizontally disposed barrier at one end of the ditch.
Figure 41:
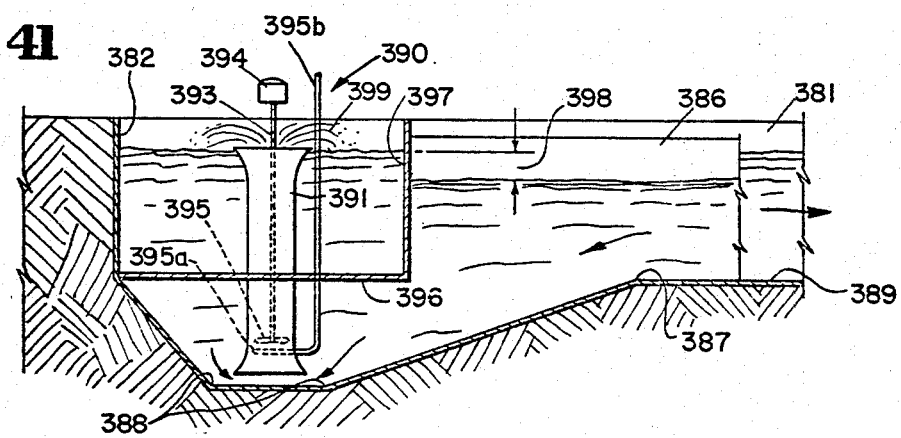
FIG. 41 is a sectional elevation through the differential-head producing means of FIG. 40, taken along the line 41—41 on the intake side thereof.
Figures 42, 43:
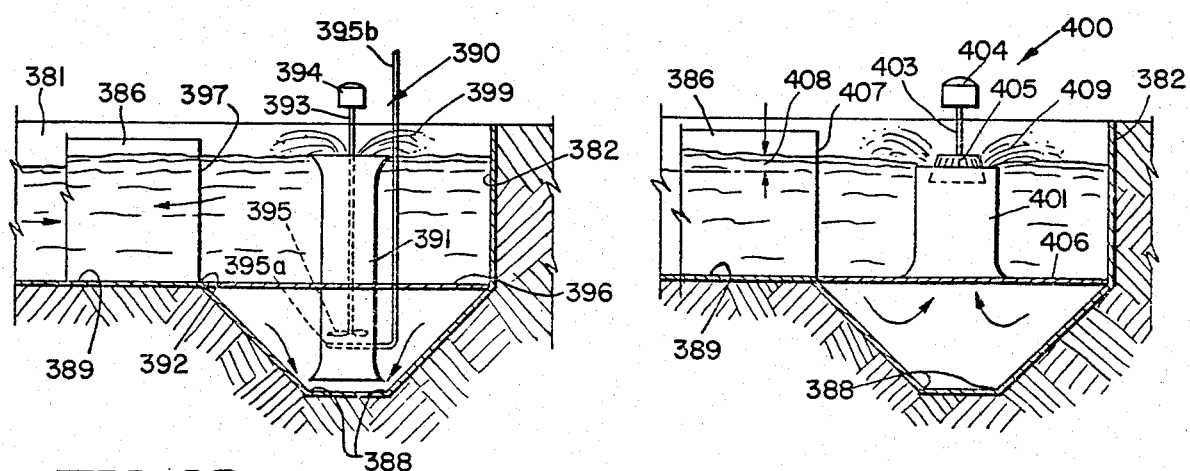
FIG. 42 is a sectional elevation through the differential-head producing means of FIG. 40, taken along the line 42—42 thereof.
FIG. 43 is a sectional elevation which is exactly like FIG. 42 except that the impeller aerator is operating through a short draft tube extending from the horizontally disposed barrier to the surface only.

In FIGS. 40-42, a closed-circuit oxidation ditch 380 has a submerged turbine as a surface aerator 390. The ditch 380 comprises a pair of parallel straight sides 381, a pair of curved sides 382 at opposite ends thereof, a central straight partition 386, and a circular guide 383 which is spaced from one curved end 382 and from one end of partition 386. Its bottom 389 declines at 387 and becomes a narrow bottom having edges 388 beneath long draft tube 391.

With shaft 393, motor 394 drives submerged turbine 395 which is disposed at an intermediate depth above an air sparger ring 395a which is supplied with air from an air delivery line 395b and is inside draft tube 391. A vertically disposed barrier 397 blocks flow across the intake channel, being sealably attached to the opposite end of partition 386, to side 381, and to one straight side of a horizontally disposed barrier 396 having approximately a semi-circular shape. The curved side of barrier 396 is sealably attached to the adjacent curved side 382 and to bottom 389 at 392. Draft tube 391 is sealably attached to barrier 396 approximately midway of its length. The floating tube assembly shown in FIG. 39 is suitably substituted for the draft tube 391, however.

Raw sewage 384 enters the intake channel, for example, and mixes with deaerated liquid to form an intake body beneath barrier 396. The mixture then enters draft tube 391, mixes with air from sparge ring 395a, and is flung outwardly as spray envelope 399 onto the surface of the discharge body, producing differential head 398. Turbulent mixing of gas and liquid occurs throughout the spray envelope 399 while the spray passes through the gas atmosphere. A portion of the aerated liquid is withdrawn as outflow 385. The remainder mixes with incoming sludge 384a, moves within the bend formed by curved side 382 and circular guide 383 and is joined by influent 384.

In FIG. 43, a section of the same oxidation ditch 380 is shown in combination with an impeller aerator apparatus 400 which comprises a short draft tube 401, a horizontally disposed barrier 406 which is sealably attached to the intake end of draft tube 401, a vertically disposed barrier 407, an impeller aerator 405 operating within draft tube 401 at its upper end, a drive shaft 403, and a motor 404. Liquid in the intake body beneath barrier 406 enters the draft tube 401 and is flung outwardly as spray 409, creating differential head 408. The floating tube assembly shown in FIG. 39 is also suitably substituted for the fixed draft tube 401.

Figure 44:
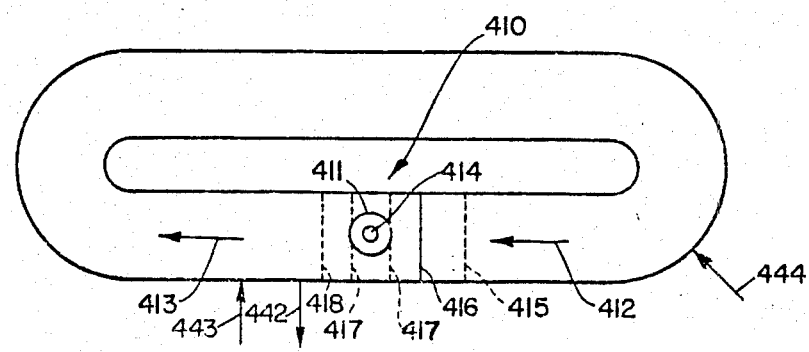
FIG. 44 is a plan view of an oxidation ditch having an impeller aerator in a draft tube attached to a differential-head producing barrier along one side of the oxidation ditch.

FIG. 44 shows a closed-circuit oxidation ditch having an impeller aerator apparatus 410 installed in one of its side channels. Similar to the construction of the oxidation ditch of FIGS. 40-43, its bottom begins to decline at 415 in an approach zone which extends beneath vertical barrier 416 to merge with a transversely disposed bottom beneath a horizontal barrier (not visible in the drawing) which extends from its sealed connection at 418 with the bottom of the channel to vertical barrier 416. A draft tube 411, having a motor 414 thereabove to operate an impeller aerator, extends at least to the horizontal barrier and may be a floating draft tube as shown in FIG. 39. Deaerated liquid 412 flows beneath vertical barrier 416 and becomes aerated liquid 413, its driving force being the differential head created by apparatus 410. A portion of the digested liquid is removed as effluent 442. The remainder mixes with influent 443. The mixture aerobically digests while moving in plug-type flow nearly completely around the ditch, being mixed with sludge return 444 shortly before encountering barrier 416.

Figure 45:
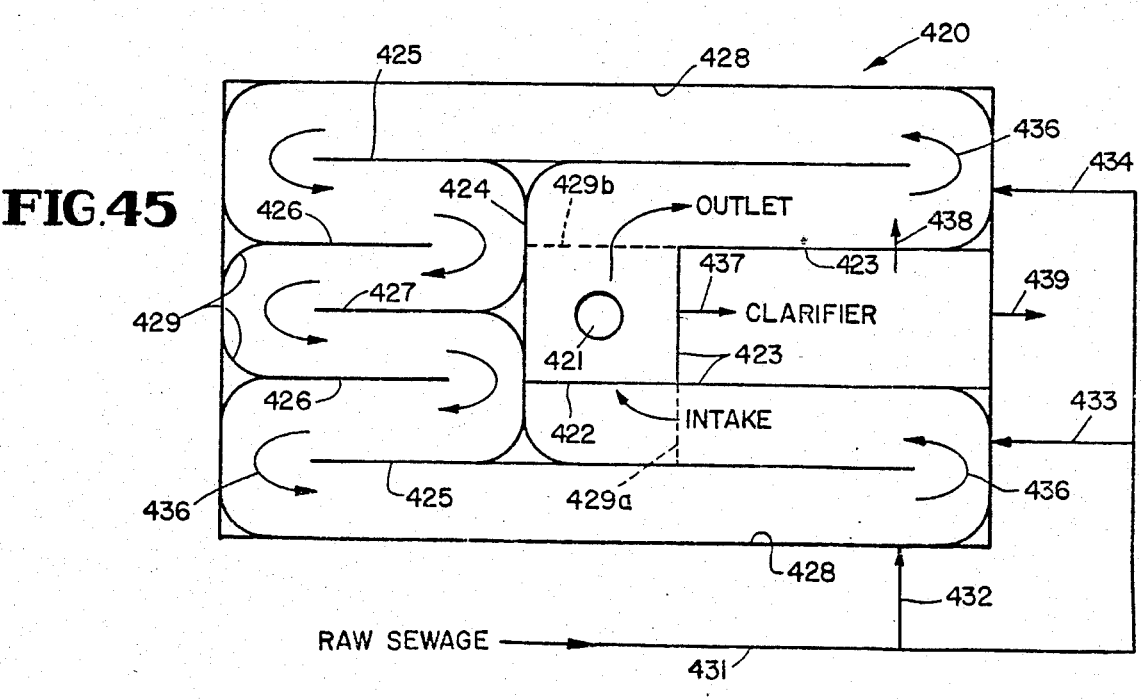
FIG. 45 is a plan view of an aerator pond of the prior art with partitions arranged to provide closed-circuit flow with repetitive aeration and clarification and, selectively, de-nitrification and including a differential-head producing impeller aerator.

FIG. 45 shows a typical vertical-flow aeration basins of the prior art which has been converted to an oxidation ditch 420 with an internal clarifier, without relocating or otherwise changing the impeller aerator 421, by adding vertically disposed partitions and a horizontally disposed barrier which is not visible in FIG. 45.

The partitions comprise clarifier partitions 423 having an intake opening for intake flow 437, a discharge opening for clarified discharge flow 439, and a sludge discharge opening for sludge flow 438. Partition 422 is the vertical barrier of the invention across the intake channel to the impeller aerator 421. The discharge body of liquid is bounded by the nearby partition 424, the vertical barrier 422, a transverse partition 424, and a submerged junction 429b of the bottom of the basin with the horizontal barrier. An approach zone to the intake body (which may or may not be excavated to a greater depth) exemplarily begins at 429a if the horizontal barrier is approximately at the depth of the bottom of the basin and the intake body is in an excavation therebeneath. Alternatively, if the horizontal barrier is substantially elevated above the bottom of the basin there is no need for a deepened approach zone so that junction 429a does not exist and junction 429b is a submerged vertical partition which defines the end of the intake body. A pair of outer longitudinal partitions 425, having a length nearly as great as the length of the basin, are parallel to and spaced from the longer sides 428 of the basin and form intake and discharge channels with the longer sides 423 of the clarifier and a pair of long outer channels with the sides 428 of the basin. A pair of end partitions 426, spaced inwardly from the outer partitions 425 and on either side of a central return partition 427, as is generally known in the art, are disposed at the end of the basin opposite to the clarifier. All partitions 423, 424, 425, 426, 427 are connected to each other and to sides 428 with curved baffles 429, as is known in the art.

Incoming wastewater 431, such as industrial food-process wastewater or municipal sewage, selectively enters the basin as influents 432, 433, and 434. The liquid in the channels makes seven circular flows 436 around the ends of the partitions 425, 426, 427 while passing through the basin and through the draft tube of the impeller aerator 421. The liquid can be aerated but once during each such pass and is selectively clarified and de-nitrified within the confines of the prior-art basin by suitable adjustment of flows 432, 433, 434, 438, 439.

In designing, constructing, and operating any system for aerobically treating wastewaters by means of a differential-head producing apparatus of this invention, any desired combination of barrier, draft tube, static aerator, impeller aerator, submerged turbine, float tube assembly, fountain assembly, oxidation ditch, and pipeline reactor may be made, depending upon BOD content, suspended-solids, content, corrosion potential, and flow rate of the wastewaters and upon available land, structural strength of the apparatus, horsepower availability, and the like. For systems for polishing treated wastewaters or potable water with activated carbon, similar latitude is available as to combining liquid-gas contactor devices and auxiliary equipment to manufacture any differential-head producing apparatus of this invention.

Because it will be readily apparent to those skilled in the art that innumerable variations, modifications, applications, and extensions of these embodiments and principles can be made without departing from the spirit and scope of the invention, what is herein defined as such scope and is desired to be protected should be measured, and the invention should be limited, only by the following claims.

What is claimed is:

1. A flow-control apparatus for minimizing vertical circulation and preventing back-mixing of aerated liquid and for translationally moving said liquid through the channel of a closed-circuit oxidation ditch, said channel having a bottom and sides which comprise a pair of parallel straight outer sides, a pair of parallel straight inner sides defining a central partition which is disposed in parallel to and midway between said outer sides, and a pair of curved sides which are disposed at opposite ends of said pair of straight outer sides and are sealably connected thereto, whereby said channel comprises a pair of straight channels and a pair of semi-circular ends connecting said straight channels, said flow control apparatus comprising, in combination with said closed-circuit oxidation ditch:
(A) at least one liquid-gas contact pump, having an intake end and a discharge end, which is disposed within one of said semi-circular ends; and
(B) a liquid-tight barrier that is sealably attached to said bottom and to said sides and to said pump between said intake end and said discharge end, so that said barrier is:
  (1) a mounting means for disposing said pump within said channel, and
  (2) a barrier means for dividing said liquid into an intake body and a discharge body so that all of the liquid in said intake body must pass through said pump to reach said discharge body and none of the liquid can pass therethrough more than once in each circuit of said closed-circuit oxidation ditch, said barrier means comprising:
    (a) a vertically disposed barrier, blocking flow across one of said straight channels and having a bottom edge and a pair of side edges, which is sealably attached to said central partition along one side edge and to one of said straight sides along the other said side edge, and
    (b) a horizontally disposed barrier having approximately a semi-circular shape, the curved edge thereof being sealably attached to the adjacent curved side of said one semi-circular end, one half of the straight edge thereof being sealably attached to said bottom edge, and the remaining one half of said straight edge being sealably attached to said bottom of said channel.

2. The flow control apparatus of claim 1, wherein:
(A) said straight channel adjacent to said vertically disposed barrier is an intake channel into which waste water is fed and said other straight channel is a discharge channel;
(B) said bottom of said channel beneath said horizontally disposed barrier is downwardly spaced therefrom to define said intake body when filled with a mixture of said wastewater and deaerated liquid; and
(C) said bottom beneath said horizontally disposed barrier and the bottom of said intake channel are connected with an inclined bottom which is downwardly spaced from said bottom edge of said vertically disposed barrier when passing therebeneath.

3. The flow-control apparatus of claim 2, wherein said liquid-gas contact pump comprises a draft tube which passes through and is sealably attached along its outer surface to said horizontally disposed barrier.

4. The flow control apparatus of claim 3, wherein said liquid-gas contact pump is a surface aerator which is disposed within said draft tube and is connected to a motor by a vertically disposed shaft.

5. The flow-control apparatus of claim 4, wherein said mixture of wastewater and deaerated liquid in said intake body enters said draft tube and is flung outwardly onto the surface of said discharge body to form aerated liquid, said discharge body being disposed above said horizontally disposed barrier, and to produce a differential head as the driving force for circulating said aerated liquid in plug-type flow through said discharge channel and said intake channel to said intake body.

6. The flow-control apparatus of claim 5, wherein:
(A) said draft tube is a short draft tube which is sealably attached at its intake end to said horizontally disposed barrier, and,
(B) said surface aerator is an impeller aerator operating within said short draft tube at the upper end thereof.

7. The flow-control apparatus of claim 3, wherein:
(A) said draft tube is a long draft tube which is sealably attached to said horizontally disposed barrier approximately midway of the length of said tube; and
(B) said liquid-gas contact pump is a submerged turbine which is disposed at an intermediate depth above an air sparger ring which is supplied with air from an air delivery line.

8. A flow-control apparatus for minimizing vertical circulation and preventing back-mixing of aerated liquid and for translationally moving said liquid through the channel of a closed-circuit oxidation ditch, said channel having a bottom and sides which comprise a pair of parallel straight outer sides, a pair of parallel straight inner sides defining a central partition which is disposed in parallel to and midway between said outer sides, and a pair of curved sides which are disposed at opposite ends of said pair of straight outer sides and are sealably connected thereto, whereby said channel comprises a pair of straight channels and a pair of semi-circular ends connecting said straight channels, said flow-control apparatus comprising, in combination with said closed-circuit oxidation ditch:
(A) at least one surface aerator having an intake end and a discharge end, which is disposed within one of said straight channels; and
(B) a liquid-tight barrier that is sealably attached to said bottom and to said sides and to said pump between said intake end and said discharge end, so that said barrier is:
  (1) a mounting means for disposing said pump within said channel, and
  (2) a barrier means for dividing said liquid into an intake body and a discharge body so that all of the liquid in said intake body must pass through said pump to reach said discharge body and none of the liquid can pass therethrough more than once in each circuit of said closed-circuit oxidation ditch, said barrier means comprising:
    (a) a vertically disposed barrier, blocking flow across said one straight channel and having a bottom edge and a pair of side edges, which is sealably attached to said inner side of said straight channel and to said outer side thereof along the other said side edge, and
    (b) a horizontally disposed barrier having a pair of transverse edges, which are sealably attached to said bottom and to said bottom edge of said vertically disposed barrier, and a pair of side edges, which are sealably attached to said outer side and to said inner side of said one straight channel; and said channel comprising, in combination with said barrier:
(A) a declining bottom within an approach zone passing beneath said vertically disposed barrier; and
(B) a transversely disposed bottom which merges with said declining bottom, is disposed beneath said horizontally disposed barrier, and is downwardly spaced therefrom.

9. The flow-control apparatus of claim 8, wherein said mounting means comprises a draft tube which passes through and is sealably attached along its outer surface to said horizontally disposed barrier.

10. The flow-control apparatus of claim 9, wherein said liquid-gas contact pump is an impeller-type surface aerator which is disposed within said draft tube at the upper end thereof.

11. The flow-control apparatus of claim 9, wherein:
(A) said draft tube is a long draft tube which is sealably attached to said horizontally disposed barrier approximately midway of the length of said tube; and
(B) said liquid-gas contact pump is a submerged turbine which is disposed at an intermediate depth above an air sparger ring which is supplied with air from an air delivery line.

* * * * *